US012796693B2

(12) United States Patent
Chen et al.

(10) Patent No.: US 12,796,693 B2
(45) **Date of Patent: *Nov. 17, 2026**

(54) USE OF THERMALLY HYDROLYZED KERATIN PEPTIDE SOLUTION IN ENHANCING THE YIELD AND QUALITY OF TEA LEAVES

(71) Applicant: CH Biotech R&D Co., Ltd., Nantou City (TW)

(72) Inventors: Iou-Zen Chen, Taipei (TW); Ming-Yuan Lee, Nantou (TW); Pei Chun Liao, New Taipei City (TW); Meng-Ying Li, Nantou (TW); Nai-Hua Ye, Changhua (TW)

(73) Assignee: CH Biotech R&D Co., Ltd., Nantou City (TW)

( * ) Notice: Subject to any disclaimer, the term of this patent is extended or adjusted under 35 U.S.C. 154(b) by 207 days.

This patent is subject to a terminal disclaimer.

(21) Appl. No.: 18/758,140

(22) Filed: Jun. 28, 2024

(65) Prior Publication Data

US 2025/0212892 A1 Jul. 3, 2025

(30) Foreign Application Priority Data

Dec. 29, 2023 (TW) ................................ 112151702

(51) Int. Cl.

*A01N 63/50* (2020.01)
*A01N 25/02* (2006.01)
*A01P 23/00* (2006.01)

(52) U.S. Cl.

CPC ............ *A01N 63/50* (2020.01); *A01N 25/02* (2013.01); *A01P 23/00* (2021.08)

(58) Field of Classification Search

CPC ................................ A01P 21/00; A01N 63/50
See application file for complete search history.

(56) References Cited

FOREIGN PATENT DOCUMENTS

WO WO 2016/054310 * 4/2016
WO WO2023/001946 * 1/2023

* cited by examiner

*Primary Examiner* — Genevieve S Alley
(74) *Attorney, Agent, or Firm* — Jen-Feng Lee, Esq.

(57) ABSTRACT

Present invention teaches the method of using a keratin hydrolysis peptide ("KHP") solution to enhance the yield and quality of tea leaves. By selectively choosing specific weights of feathers and water, and treating the mixture to a high-temperature high-pressure hydrolysis process, the resulting solution is confirmed to contain at least 253 peptides and then apply to the tea trees either by infusing to the soil or by leaf spray at certain growth stages. Optionally, the KHP solution can be diluted by water, as disclosed in the specification, for soil infusing or leaf spraying.

10 Claims, 9 Drawing Sheets

Specification includes a Sequence Listing.

SEQUENCE LISTING

```
Sequence total quantity: 253
SEQ ID NO: 1            moltype = AA  length = 6
FEATURE                 Location/Qualifiers
source                  1..6
                        mol_type = protein
                        organism = Gallus gallus
SEQUENCE: 1
FGLSGL                                                             6

SEQ ID NO: 2            moltype = AA  length = 7
FEATURE                 Location/Qualifiers
source                  1..7
                        mol_type = protein
                        organism = Gallus gallus
SEQUENCE: 2
AAVGSSL                                                            7

SEQ ID NO: 3            moltype = AA  length = 7
FEATURE                 Location/Qualifiers
source                  1..7
                        mol_type = protein
                        organism = Gallus gallus
SEQUENCE: 3
TAVGSST                                                            7

SEQ ID NO: 4            moltype = AA  length = 6
FEATURE                 Location/Qualifiers
source                  1..6
                        mol_type = protein
                        organism = Gallus gallus
SEQUENCE: 4
LSLSSQ                                                             6

SEQ ID NO: 5            moltype = AA  length = 7
FEATURE                 Location/Qualifiers
source                  1..7
                        mol_type = protein
                        organism = Gallus gallus
SEQUENCE: 5
FGISGLG                                                            7

SEQ ID NO: 6            moltype = AA  length = 6
FEATURE                 Location/Qualifiers
source                  1..6
                        mol_type = protein
                        organism = Gallus gallus
SEQUENCE: 6
PILSSF                                                             6

SEQ ID NO: 7            moltype = AA  length = 7
FEATURE                 Location/Qualifiers
source                  1..7
                        mol_type = protein
                        organism = Gallus gallus
SEQUENCE: 7
SLLSQGA                                                            7

SEQ ID NO: 8            moltype = AA  length = 6
FEATURE                 Location/Qualifiers
source                  1..6
                        mol_type = protein
                        organism = Gallus gallus
SEQUENCE: 8
FNLRGA                                                             6
```

-continued

```
SEQ ID NO: 9            moltype = AA  length = 8
FEATURE                 Location/Qualifiers
source                  1..8
                        mol_type = protein
                        organism = Gallus gallus
SEQUENCE: 9
SAAVGSSL                                                                     8

SEQ ID NO: 10           moltype = AA  length = 6
FEATURE                 Location/Qualifiers
source                  1..6
                        mol_type = protein
                        organism = Gallus gallus
SEQUENCE: 10
SRVVIQ                                                                       6

SEQ ID NO: 11           moltype = AA  length = 6
FEATURE                 Location/Qualifiers
source                  1..6
                        mol_type = protein
                        organism = Gallus gallus
SEQUENCE: 11
SRVVLE                                                                       6

SEQ ID NO: 12           moltype = AA  length = 8
FEATURE                 Location/Qualifiers
source                  1..8
                        mol_type = protein
                        organism = Gallus gallus
SEQUENCE: 12
GFGISGLG                                                                     8

SEQ ID NO: 13           moltype = AA  length = 6
FEATURE                 Location/Qualifiers
source                  1..6
                        mol_type = protein
                        organism = Gallus gallus
SEQUENCE: 13
SRFSGR                                                                       6

SEQ ID NO: 14           moltype = AA  length = 6
FEATURE                 Location/Qualifiers
source                  1..6
                        mol_type = protein
                        organism = Gallus gallus
SEQUENCE: 14
RVVIQP                                                                       6

SEQ ID NO: 15           moltype = AA  length = 8
FEATURE                 Location/Qualifiers
source                  1..8
                        mol_type = protein
                        organism = Gallus gallus
SEQUENCE: 15
SAAVGSIL                                                                     8

SEQ ID NO: 16           moltype = AA  length = 7
FEATURE                 Location/Qualifiers
source                  1..7
                        mol_type = protein
                        organism = Gallus gallus
SEQUENCE: 16
IVVIGHV                                                                      7

SEQ ID NO: 17           moltype = AA  length = 9
FEATURE                 Location/Qualifiers
source                  1..9
                        mol_type = protein
                        organism = Gallus gallus
SEQUENCE: 17
TAVGSSTSA                                                                    9

SEQ ID NO: 18           moltype = AA  length = 7
FEATURE                 Location/Qualifiers
source                  1..7
                        mol_type = protein
                        organism = Gallus gallus
SEQUENCE: 18
RVVIQPS                                                                      7
```

```
SEQ ID NO: 19          moltype = AA  length = 7
FEATURE                Location/Qualifiers
source                 1..7
                       mol_type = protein
                       organism = Gallus gallus
SEQUENCE: 19
SRVVIQP                                                      7

SEQ ID NO: 20          moltype = AA  length = 7
FEATURE                Location/Qualifiers
source                 1..7
                       mol_type = protein
                       organism = Gallus gallus
SEQUENCE: 20
PQGEQLQ                                                      7

SEQ ID NO: 21          moltype = AA  length = 9
FEATURE                Location/Qualifiers
source                 1..9
                       mol_type = protein
                       organism = Gallus gallus
SEQUENCE: 21
RAGAGPPSP                                                    9

SEQ ID NO: 22          moltype = AA  length = 7
FEATURE                Location/Qualifiers
source                 1..7
                       mol_type = protein
                       organism = Gallus gallus
SEQUENCE: 22
DSRVVIQ                                                      7

SEQ ID NO: 23          moltype = AA  length = 8
FEATURE                Location/Qualifiers
source                 1..8
                       mol_type = protein
                       organism = Gallus gallus
SEQUENCE: 23
PGPILSSF                                                     8

SEQ ID NO: 24          moltype = AA  length = 9
FEATURE                Location/Qualifiers
source                 1..9
                       mol_type = protein
                       organism = Gallus gallus
SEQUENCE: 24
PISSGGFGI                                                    9

SEQ ID NO: 25          moltype = AA  length = 8
FEATURE                Location/Qualifiers
source                 1..8
                       mol_type = protein
                       organism = Gallus gallus
SEQUENCE: 25
ISGLGSRF                                                     8

SEQ ID NO: 26          moltype = AA  length = 10
FEATURE                Location/Qualifiers
source                 1..10
                       mol_type = protein
                       organism = Gallus gallus
SEQUENCE: 26
SGGFGISGLG                                                   10

SEQ ID NO: 27          moltype = AA  length = 7
FEATURE                Location/Qualifiers
source                 1..7
                       mol_type = protein
                       organism = Gallus gallus
SEQUENCE: 27
SRFSGRR                                                      7

SEQ ID NO: 28          moltype = AA  length = 9
FEATURE                Location/Qualifiers
source                 1..9
                       mol_type = protein
                       organism = Gallus gallus
SEQUENCE: 28
```

```
PGLALPVLP                                                    9

SEQ ID NO: 29          moltype = AA  length = 8
FEATURE                Location/Qualifiers
source                 1..8
                       mol_type = protein
                       organism = Gallus gallus
SEQUENCE: 29
SRVVIQPS                                                     8

SEQ ID NO: 30          moltype = AA  length = 8
FEATURE                Location/Qualifiers
source                 1..8
                       mol_type = protein
                       organism = Gallus gallus
SEQUENCE: 30
PILSSFPQ                                                     8

SEQ ID NO: 31          moltype = AA  length = 8
FEATURE                Location/Qualifiers
source                 1..8
                       mol_type = protein
                       organism = Gallus gallus
SEQUENCE: 31
LGSGIFWI                                                     8

SEQ ID NO: 32          moltype = AA  length = 9
FEATURE                Location/Qualifiers
source                 1..9
                       mol_type = protein
                       organism = Gallus gallus
SEQUENCE: 32
GISGLGSRF                                                    9

SEQ ID NO: 33          moltype = AA  length = 9
FEATURE                Location/Qualifiers
source                 1..9
                       mol_type = protein
                       organism = Gallus gallus
SEQUENCE: 33
VVVTLPGPI                                                    9

SEQ ID NO: 34          moltype = AA  length = 8
FEATURE                Location/Qualifiers
source                 1..8
                       mol_type = protein
                       organism = Gallus gallus
SEQUENCE: 34
CRLSLSQP                                                     8

SEQ ID NO: 35          moltype = AA  length = 11
FEATURE                Location/Qualifiers
source                 1..11
                       mol_type = protein
                       organism = Gallus gallus
SEQUENCE: 35
SAAVGSSLSA G                                                 11

SEQ ID NO: 36          moltype = AA  length = 11
FEATURE                Location/Qualifiers
source                 1..11
                       mol_type = protein
                       organism = Gallus gallus
SEQUENCE: 36
AVGSSTSAAV G                                                 11

SEQ ID NO: 37          moltype = AA  length = 9
FEATURE                Location/Qualifiers
source                 1..9
                       mol_type = protein
                       organism = Gallus gallus
SEQUENCE: 37
VVTLPGPIL                                                    9

SEQ ID NO: 38          moltype = AA  length = 9
FEATURE                Location/Qualifiers
source                 1..9
                       mol_type = protein
                       organism = Gallus gallus
```

```
SEQUENCE: 38
PGPILSSFP                                                         9

SEQ ID NO: 39           moltype = AA  length = 10
FEATURE                 Location/Qualifiers
source                  1..10
                        mol_type = protein
                        organism = Gallus gallus
SEQUENCE: 39
SAAVGSILSE                                                        10

SEQ ID NO: 40           moltype = AA  length = 10
FEATURE                 Location/Qualifiers
source                  1..10
                        mol_type = protein
                        organism = Gallus gallus
SEQUENCE: 40
VPISSGGFGI                                                        10

SEQ ID NO: 41           moltype = AA  length = 8
FEATURE                 Location/Qualifiers
source                  1..8
                        mol_type = protein
                        organism = Gallus gallus
SEQUENCE: 41
QLAQRNTI                                                          8

SEQ ID NO: 42           moltype = AA  length = 9
FEATURE                 Location/Qualifiers
source                  1..9
                        mol_type = protein
                        organism = Gallus gallus
SEQUENCE: 42
LSGLRSNLS                                                         9

SEQ ID NO: 43           moltype = AA  length = 10
FEATURE                 Location/Qualifiers
source                  1..10
                        mol_type = protein
                        organism = Gallus gallus
SEQUENCE: 43
PSPVVVTLPG                                                        10

SEQ ID NO: 44           moltype = AA  length = 10
FEATURE                 Location/Qualifiers
source                  1..10
                        mol_type = protein
                        organism = Gallus gallus
SEQUENCE: 44
PPPVVVTLPG                                                        10

SEQ ID NO: 45           moltype = AA  length = 10
FEATURE                 Location/Qualifiers
source                  1..10
                        mol_type = protein
                        organism = Gallus gallus
SEQUENCE: 45
ISGLGSRFSG                                                        10

SEQ ID NO: 46           moltype = AA  length = 9
FEATURE                 Location/Qualifiers
source                  1..9
                        mol_type = protein
                        organism = Gallus gallus
SEQUENCE: 46
LALRQSVEA                                                         9

SEQ ID NO: 47           moltype = AA  length = 10
FEATURE                 Location/Qualifiers
source                  1..10
                        mol_type = protein
                        organism = Gallus gallus
SEQUENCE: 47
PLLGPPLLGI                                                        10

SEQ ID NO: 48           moltype = AA  length = 10
FEATURE                 Location/Qualifiers
source                  1..10
                        mol_type = protein
```

```
                      organism = Gallus gallus
SEQUENCE: 48
VVTLPGPILS                                                            10

SEQ ID NO: 49         moltype = AA  length = 8
FEATURE               Location/Qualifiers
source                1..8
                      mol_type = protein
                      organism = Gallus gallus
SEQUENCE: 49
VTLEDLRR                                                              8

SEQ ID NO: 50         moltype = AA  length = 9
FEATURE               Location/Qualifiers
source                1..9
                      mol_type = protein
                      organism = Gallus gallus
SEQUENCE: 50
PILSSFPQN                                                             9

SEQ ID NO: 51         moltype = AA  length = 9
FEATURE               Location/Qualifiers
source                1..9
                      mol_type = protein
                      organism = Gallus gallus
SEQUENCE: 51
PILSSFPQD                                                             9

SEQ ID NO: 52         moltype = AA  length = 11
FEATURE               Location/Qualifiers
source                1..11
                      mol_type = protein
                      organism = Gallus gallus
SEQUENCE: 52
GTVGVSAGVT R                                                          11

SEQ ID NO: 53         moltype = AA  length = 9
FEATURE               Location/Qualifiers
source                1..9
                      mol_type = protein
                      organism = Gallus gallus
SEQUENCE: 53
FGLSRVTLN                                                             9

SEQ ID NO: 54         moltype = AA  length = 12
FEATURE               Location/Qualifiers
source                1..12
                      mol_type = protein
                      organism = Gallus gallus
SEQUENCE: 54
TAVGSSTSAA VG                                                         12

SEQ ID NO: 55         moltype = AA  length = 10
FEATURE               Location/Qualifiers
source                1..10
                      mol_type = protein
                      organism = Gallus gallus
SEQUENCE: 55
VVVTLPGPIL                                                            10

SEQ ID NO: 56         moltype = AA  length = 10
FEATURE               Location/Qualifiers
source                1..10
                      mol_type = protein
                      organism = Gallus gallus
SEQUENCE: 56
PPVVVTFPGP                                                            10

SEQ ID NO: 57         moltype = AA  length = 10
FEATURE               Location/Qualifiers
source                1..10
                      mol_type = protein
                      organism = Gallus gallus
SEQUENCE: 57
PPPVVVTFPG                                                            10

SEQ ID NO: 58         moltype = AA  length = 10
FEATURE               Location/Qualifiers
source                1..10
```

```
                        mol_type = protein
                        organism = Gallus gallus
SEQUENCE: 58
VVIQPSPVVV                                                   10

SEQ ID NO: 59           moltype = AA  length = 10
FEATURE                 Location/Qualifiers
source                  1..10
                        mol_type = protein
                        organism = Gallus gallus
SEQUENCE: 59
FGISGLGSRF                                                   10

SEQ ID NO: 60           moltype = AA  length = 10
FEATURE                 Location/Qualifiers
source                  1..10
                        mol_type = protein
                        organism = Gallus gallus
SEQUENCE: 60
PGPILSSFPQ                                                   10

SEQ ID NO: 61           moltype = AA  length = 10
FEATURE                 Location/Qualifiers
source                  1..10
                        mol_type = protein
                        organism = Gallus gallus
SEQUENCE: 61
FGWSGLGRGL                                                   10

SEQ ID NO: 62           moltype = AA  length = 9
FEATURE                 Location/Qualifiers
source                  1..9
                        mol_type = protein
                        organism = Gallus gallus
SEQUENCE: 62
LEAQLSELR                                                    9

SEQ ID NO: 63           moltype = AA  length = 9
FEATURE                 Location/Qualifiers
source                  1..9
                        mol_type = protein
                        organism = Gallus gallus
SEQUENCE: 63
IVGAWYTVR                                                    9

SEQ ID NO: 64           moltype = AA  length = 11
FEATURE                 Location/Qualifiers
source                  1..11
                        mol_type = protein
                        organism = Gallus gallus
SEQUENCE: 64
LLSPPGLPGL L                                                 11

SEQ ID NO: 65           moltype = AA  length = 11
FEATURE                 Location/Qualifiers
source                  1..11
                        mol_type = protein
                        organism = Gallus gallus
SEQUENCE: 65
VVVTLPGPIL S                                                 11

SEQ ID NO: 66           moltype = AA  length = 11
FEATURE                 Location/Qualifiers
source                  1..11
                        mol_type = protein
                        organism = Gallus gallus
SEQUENCE: 66
GFGISGLGSR F                                                 11

SEQ ID NO: 67           moltype = AA  length = 11
FEATURE                 Location/Qualifiers
source                  1..11
                        mol_type = protein
                        organism = Gallus gallus
SEQUENCE: 67
PVVVTLPGPI L                                                 11

SEQ ID NO: 68           moltype = AA  length = 11
FEATURE                 Location/Qualifiers
```

```
source                  1..11
                        mol_type = protein
                        organism = Gallus gallus
SEQUENCE: 68
VSQGEITVPS I                                                               11

SEQ ID NO: 69           moltype = AA  length = 11
FEATURE                 Location/Qualifiers
source                  1..11
                        mol_type = protein
                        organism = Gallus gallus
SEQUENCE: 69
SILSEEGVPI S                                                               11

SEQ ID NO: 70           moltype = AA  length = 11
FEATURE                 Location/Qualifiers
source                  1..11
                        mol_type = protein
                        organism = Gallus gallus
SEQUENCE: 70
PVVVTFPGPI L                                                               11

SEQ ID NO: 71           moltype = AA  length = 13
FEATURE                 Location/Qualifiers
source                  1..13
                        mol_type = protein
                        organism = Gallus gallus
SEQUENCE: 71
PISSGGFGIS GLG                                                             13

SEQ ID NO: 72           moltype = AA  length = 13
FEATURE                 Location/Qualifiers
source                  1..13
                        mol_type = protein
                        organism = Gallus gallus
SEQUENCE: 72
VGSSTSAAVG SIL                                                             13

SEQ ID NO: 73           moltype = AA  length = 11
FEATURE                 Location/Qualifiers
source                  1..11
                        mol_type = protein
                        organism = Gallus gallus
SEQUENCE: 73
GFLSSAVSLN R                                                               11

SEQ ID NO: 74           moltype = AA  length = 12
FEATURE                 Location/Qualifiers
source                  1..12
                        mol_type = protein
                        organism = Gallus gallus
SEQUENCE: 74
GGFGISGLGS RF                                                              12

SEQ ID NO: 75           moltype = AA  length = 11
FEATURE                 Location/Qualifiers
source                  1..11
                        mol_type = protein
                        organism = Gallus gallus
SEQUENCE: 75
PGPILSSFPQ N                                                               11

SEQ ID NO: 76           moltype = AA  length = 11
FEATURE                 Location/Qualifiers
source                  1..11
                        mol_type = protein
                        organism = Gallus gallus
SEQUENCE: 76
PGPILSSFPQ D                                                               11

SEQ ID NO: 77           moltype = AA  length = 12
FEATURE                 Location/Qualifiers
source                  1..12
                        mol_type = protein
                        organism = Gallus gallus
SEQUENCE: 77
GGFGWSGLGR GL                                                              12

SEQ ID NO: 78           moltype = AA  length = 12
```

```
FEATURE                 Location/Qualifiers
source                  1..12
                        mol_type = protein
                        organism = Gallus gallus
SEQUENCE: 78
PSPVVVTLPG PI                                                          12

SEQ ID NO: 79           moltype = AA  length = 12
FEATURE                 Location/Qualifiers
source                  1..12
                        mol_type = protein
                        organism = Gallus gallus
SEQUENCE: 79
VVVTLPGPIL SS                                                          12

SEQ ID NO: 80           moltype = AA  length = 12
FEATURE                 Location/Qualifiers
source                  1..12
                        mol_type = protein
                        organism = Gallus gallus
SEQUENCE: 80
PVVVTLPGPI LS                                                          12

SEQ ID NO: 81           moltype = AA  length = 12
FEATURE                 Location/Qualifiers
source                  1..12
                        mol_type = protein
                        organism = Gallus gallus
SEQUENCE: 81
SPVVVTLPGP IL                                                          12

SEQ ID NO: 82           moltype = AA  length = 11
FEATURE                 Location/Qualifiers
source                  1..11
                        mol_type = protein
                        organism = Gallus gallus
SEQUENCE: 82
RVVIQPSPVV V                                                           11

SEQ ID NO: 83           moltype = AA  length = 11
FEATURE                 Location/Qualifiers
source                  1..11
                        mol_type = protein
                        organism = Gallus gallus
SEQUENCE: 83
QALTEVYAKA N                                                           11

SEQ ID NO: 84           moltype = AA  length = 10
FEATURE                 Location/Qualifiers
source                  1..10
                        mol_type = protein
                        organism = Gallus gallus
SEQUENCE: 84
IETLTQFLGW                                                             10

SEQ ID NO: 85           moltype = AA  length = 13
FEATURE                 Location/Qualifiers
source                  1..13
                        mol_type = protein
                        organism = Gallus gallus
SEQUENCE: 85
GFGSRSLVGL GGT                                                         13

SEQ ID NO: 86           moltype = AA  length = 14
FEATURE                 Location/Qualifiers
source                  1..14
                        mol_type = protein
                        organism = Gallus gallus
SEQUENCE: 86
AVGSSTSAAV GSIL                                                        14

SEQ ID NO: 87           moltype = AA  length = 12
FEATURE                 Location/Qualifiers
source                  1..12
                        mol_type = protein
                        organism = Gallus gallus
SEQUENCE: 87
PVVVTFPGPI LS                                                          12
```

```
SEQ ID NO: 88          moltype = AA  length = 14
FEATURE                Location/Qualifiers
source                 1..14
                       mol_type = protein
                       organism = Gallus gallus
SEQUENCE: 88
VGSSTSAAVG SILS                                                    14

SEQ ID NO: 89          moltype = AA  length = 13
FEATURE                Location/Qualifiers
source                 1..13
                       mol_type = protein
                       organism = Gallus gallus
SEQUENCE: 89
GFGISGLGSR FSG                                                     13

SEQ ID NO: 90          moltype = AA  length = 13
FEATURE                Location/Qualifiers
source                 1..13
                       mol_type = protein
                       organism = Gallus gallus
SEQUENCE: 90
SGGFGISGLG SRF                                                     13

SEQ ID NO: 91          moltype = AA  length = 14
FEATURE                Location/Qualifiers
source                 1..14
                       mol_type = protein
                       organism = Gallus gallus
SEQUENCE: 91
VPISSGGFGI SGLG                                                    14

SEQ ID NO: 92          moltype = AA  length = 12
FEATURE                Location/Qualifiers
source                 1..12
                       mol_type = protein
                       organism = Gallus gallus
SEQUENCE: 92
VVIQPSPVVV TL                                                      12

SEQ ID NO: 93          moltype = AA  length = 13
FEATURE                Location/Qualifiers
source                 1..13
                       mol_type = protein
                       organism = Gallus gallus
SEQUENCE: 93
SILSEEGVPI SSG                                                     13

SEQ ID NO: 94          moltype = AA  length = 13
FEATURE                Location/Qualifiers
source                 1..13
                       mol_type = protein
                       organism = Gallus gallus
SEQUENCE: 94
VMGCKAAGAS RII                                                     13

SEQ ID NO: 95          moltype = AA  length = 13
FEATURE                Location/Qualifiers
source                 1..13
                       mol_type = protein
                       organism = Gallus gallus
SEQUENCE: 95
SPVVVTLPGP ILS                                                     13

SEQ ID NO: 96          moltype = AA  length = 12
FEATURE                Location/Qualifiers
source                 1..12
                       mol_type = protein
                       organism = Gallus gallus
SEQUENCE: 96
SRVVIQPSPV VV                                                      12

SEQ ID NO: 97          moltype = AA  length = 13
FEATURE                Location/Qualifiers
source                 1..13
                       mol_type = protein
                       organism = Gallus gallus
SEQUENCE: 97
PSPVVVTLPG PIL                                                     13
```

```
SEQ ID NO: 98           moltype = AA  length = 12
FEATURE                 Location/Qualifiers
source                  1..12
                        mol_type = protein
                        organism = Gallus gallus
SEQUENCE: 98
RVVIQPSPVV VT                                                            12

SEQ ID NO: 99           moltype = AA  length = 13
FEATURE                 Location/Qualifiers
source                  1..13
                        mol_type = protein
                        organism = Gallus gallus
SEQUENCE: 99
PPPVVVTLPG PIL                                                           13

SEQ ID NO: 100          moltype = AA  length = 15
FEATURE                 Location/Qualifiers
source                  1..15
                        mol_type = protein
                        organism = Gallus gallus
SEQUENCE: 100
GVPISSGGFG ISGLG                                                         15

SEQ ID NO: 101          moltype = AA  length = 13
FEATURE                 Location/Qualifiers
source                  1..13
                        mol_type = protein
                        organism = Gallus gallus
SEQUENCE: 101
VIQPSPVVVT LPG                                                           13

SEQ ID NO: 102          moltype = AA  length = 15
FEATURE                 Location/Qualifiers
source                  1..15
                        mol_type = protein
                        organism = Gallus gallus
SEQUENCE: 102
AVGSSTSAAV GSILS                                                         15

SEQ ID NO: 103          moltype = AA  length = 15
FEATURE                 Location/Qualifiers
source                  1..15
                        mol_type = protein
                        organism = Gallus gallus
SEQUENCE: 103
TAVGSSTSAA VGSIL                                                         15

SEQ ID NO: 104          moltype = AA  length = 14
FEATURE                 Location/Qualifiers
source                  1..14
                        mol_type = protein
                        organism = Gallus gallus
SEQUENCE: 104
SGGFGISGLG SRFS                                                          14

SEQ ID NO: 105          moltype = AA  length = 13
FEATURE                 Location/Qualifiers
source                  1..13
                        mol_type = protein
                        organism = Gallus gallus
SEQUENCE: 105
VVVTLPGPIL SSF                                                           13

SEQ ID NO: 106          moltype = AA  length = 13
FEATURE                 Location/Qualifiers
source                  1..13
                        mol_type = protein
                        organism = Gallus gallus
SEQUENCE: 106
PPPVVVTFPG PIL                                                           13

SEQ ID NO: 107          moltype = AA  length = 14
FEATURE                 Location/Qualifiers
source                  1..14
                        mol_type = protein
                        organism = Gallus gallus
SEQUENCE: 107
```

```
GLGGFGWSGL GRGL                                                     14

SEQ ID NO: 108          moltype = AA  length = 13
FEATURE                 Location/Qualifiers
source                  1..13
                        mol_type = protein
                        organism = Gallus gallus
SEQUENCE: 108
VTLPGPILSS FPQ                                                      13

SEQ ID NO: 109          moltype = AA  length = 14
FEATURE                 Location/Qualifiers
source                  1..14
                        mol_type = protein
                        organism = Gallus gallus
SEQUENCE: 109
AVGSILSEEG VPIS                                                     14

SEQ ID NO: 110          moltype = AA  length = 14
FEATURE                 Location/Qualifiers
source                  1..14
                        mol_type = protein
                        organism = Gallus gallus
SEQUENCE: 110
SLGLGGFGWS GLGR                                                     14

SEQ ID NO: 111          moltype = AA  length = 14
FEATURE                 Location/Qualifiers
source                  1..14
                        mol_type = protein
                        organism = Gallus gallus
SEQUENCE: 111
PSPVVVTLPG PILS                                                     14

SEQ ID NO: 112          moltype = AA  length = 13
FEATURE                 Location/Qualifiers
source                  1..13
                        mol_type = protein
                        organism = Gallus gallus
SEQUENCE: 112
SRVVIQPSPV VVT                                                      13

SEQ ID NO: 113          moltype = AA  length = 15
FEATURE                 Location/Qualifiers
source                  1..15
                        mol_type = protein
                        organism = Gallus gallus
SEQUENCE: 113
SGGFGISGLG SRFSG                                                    15

SEQ ID NO: 114          moltype = AA  length = 14
FEATURE                 Location/Qualifiers
source                  1..14
                        mol_type = protein
                        organism = Gallus gallus
SEQUENCE: 114
PPPVVVTLPG PILS                                                     14

SEQ ID NO: 115          moltype = AA  length = 14
FEATURE                 Location/Qualifiers
source                  1..14
                        mol_type = protein
                        organism = Gallus gallus
SEQUENCE: 115
VAIQPPPVVV TLPG                                                     14

SEQ ID NO: 116          moltype = AA  length = 15
FEATURE                 Location/Qualifiers
source                  1..15
                        mol_type = protein
                        organism = Gallus gallus
SEQUENCE: 116
PISSGGFGIS GLGSR                                                    15

SEQ ID NO: 117          moltype = AA  length = 13
FEATURE                 Location/Qualifiers
source                  1..13
                        mol_type = protein
                        organism = Gallus gallus
```

```
SEQUENCE: 117
PIVDVAEALL HVK                                                    13

SEQ ID NO: 118         moltype = AA  length = 14
FEATURE                Location/Qualifiers
source                 1..14
                       mol_type = protein
                       organism = Gallus gallus
SEQUENCE: 118
VVIQPSPVVV TLPG                                                   14

SEQ ID NO: 119         moltype = AA  length = 13
FEATURE                Location/Qualifiers
source                 1..13
                       mol_type = protein
                       organism = Gallus gallus
SEQUENCE: 119
RVVIQPSPVV VTL                                                    13

SEQ ID NO: 120         moltype = AA  length = 16
FEATURE                Location/Qualifiers
source                 1..16
                       mol_type = protein
                       organism = Gallus gallus
SEQUENCE: 120
TAVGSSTSAA VGSILS                                                 16

SEQ ID NO: 121         moltype = AA  length = 14
FEATURE                Location/Qualifiers
source                 1..14
                       mol_type = protein
                       organism = Gallus gallus
SEQUENCE: 121
PPPVVVTFPG PILS                                                   14

SEQ ID NO: 122         moltype = AA  length = 15
FEATURE                Location/Qualifiers
source                 1..15
                       mol_type = protein
                       organism = Gallus gallus
SEQUENCE: 122
SLGLGGFGWS GLGRG                                                  15

SEQ ID NO: 123         moltype = AA  length = 14
FEATURE                Location/Qualifiers
source                 1..14
                       mol_type = protein
                       organism = Gallus gallus
SEQUENCE: 123
VVVTLPGPIL SSFP                                                   14

SEQ ID NO: 124         moltype = AA  length = 14
FEATURE                Location/Qualifiers
source                 1..14
                       mol_type = protein
                       organism = Gallus gallus
SEQUENCE: 124
PVVVTLPGPI LSSF                                                   14

SEQ ID NO: 125         moltype = AA  length = 15
FEATURE                Location/Qualifiers
source                 1..15
                       mol_type = protein
                       organism = Gallus gallus
SEQUENCE: 125
AAVGSILSEE GVPIS                                                  15

SEQ ID NO: 126         moltype = AA  length = 15
FEATURE                Location/Qualifiers
source                 1..15
                       mol_type = protein
                       organism = Gallus gallus
SEQUENCE: 126
SAAVGSILSE EGVPI                                                  15

SEQ ID NO: 127         moltype = AA  length = 16
FEATURE                Location/Qualifiers
source                 1..16
                       mol_type = protein
```

```
                          organism = Gallus gallus
SEQUENCE: 127
EGVPISSGGF GISGLG                                                  16

SEQ ID NO: 128            moltype = AA  length = 14
FEATURE                   Location/Qualifiers
source                    1..14
                          mol_type = protein
                          organism = Gallus gallus
SEQUENCE: 128
VVTLPGPILS SFPQ                                                    14

SEQ ID NO: 129            moltype = AA  length = 15
FEATURE                   Location/Qualifiers
source                    1..15
                          mol_type = protein
                          organism = Gallus gallus
SEQUENCE: 129
PSPVVVTLPG PILSS                                                   15

SEQ ID NO: 130            moltype = AA  length = 16
FEATURE                   Location/Qualifiers
source                    1..16
                          mol_type = protein
                          organism = Gallus gallus
SEQUENCE: 130
GKDGPKGVRG DAGPPG                                                  16

SEQ ID NO: 131            moltype = AA  length = 15
FEATURE                   Location/Qualifiers
source                    1..15
                          mol_type = protein
                          organism = Gallus gallus
SEQUENCE: 131
SVAIQPPPVV VTLPG                                                   15

SEQ ID NO: 132            moltype = AA  length = 14
FEATURE                   Location/Qualifiers
source                    1..14
                          mol_type = protein
                          organism = Gallus gallus
SEQUENCE: 132
SRVVIQPSPV VVTL                                                    14

SEQ ID NO: 133            moltype = AA  length = 14
FEATURE                   Location/Qualifiers
source                    1..14
                          mol_type = protein
                          organism = Gallus gallus
SEQUENCE: 133
LHTEAAATVP DRSE                                                    14

SEQ ID NO: 134            moltype = AA  length = 15
FEATURE                   Location/Qualifiers
source                    1..15
                          mol_type = protein
                          organism = Gallus gallus
SEQUENCE: 134
VVIQPSPVVV TLPGP                                                   15

SEQ ID NO: 135            moltype = AA  length = 14
FEATURE                   Location/Qualifiers
source                    1..14
                          mol_type = protein
                          organism = Gallus gallus
SEQUENCE: 135
RVVIQPSPVV VTLP                                                    14

SEQ ID NO: 136            moltype = AA  length = 16
FEATURE                   Location/Qualifiers
source                    1..16
                          mol_type = protein
                          organism = Gallus gallus
SEQUENCE: 136
SAAVGSILSE EGVPIS                                                  16

SEQ ID NO: 137            moltype = AA  length = 15
FEATURE                   Location/Qualifiers
source                    1..15
```

```
                        mol_type = protein
                        organism = Gallus gallus
SEQUENCE: 137
PVVVTLPGPI LSSFP                                                    15

SEQ ID NO: 138          moltype = AA  length = 15
FEATURE                 Location/Qualifiers
source                  1..15
                        mol_type = protein
                        organism = Gallus gallus
SEQUENCE: 138
IQPSPVVVTL PGPIL                                                    15

SEQ ID NO: 139          moltype = AA  length = 17
FEATURE                 Location/Qualifiers
source                  1..17
                        mol_type = protein
                        organism = Gallus gallus
SEQUENCE: 139
SVPIGAGGSL GLGGFGW                                                  17

SEQ ID NO: 140          moltype = AA  length = 16
FEATURE                 Location/Qualifiers
source                  1..16
                        mol_type = protein
                        organism = Gallus gallus
SEQUENCE: 140
SLGLGGFGWS GLGRGL                                                   16

SEQ ID NO: 141          moltype = AA  length = 17
FEATURE                 Location/Qualifiers
source                  1..17
                        mol_type = protein
                        organism = Gallus gallus
SEQUENCE: 141
FGGGFGGGDG ILPAGEK                                                  17

SEQ ID NO: 142          moltype = AA  length = 17
FEATURE                 Location/Qualifiers
source                  1..17
                        mol_type = protein
                        organism = Gallus gallus
SEQUENCE: 142
TAVGSSTSAA VGSILSE                                                  17

SEQ ID NO: 143          moltype = AA  length = 16
FEATURE                 Location/Qualifiers
source                  1..16
                        mol_type = protein
                        organism = Gallus gallus
SEQUENCE: 143
PISSGGFGIS GLGSRF                                                   16

SEQ ID NO: 144          moltype = AA  length = 19
FEATURE                 Location/Qualifiers
source                  1..19
                        mol_type = protein
                        organism = Gallus gallus
SEQUENCE: 144
SAAVGSSLSA GSVPIGAGG                                                19

SEQ ID NO: 145          moltype = AA  length = 17
FEATURE                 Location/Qualifiers
source                  1..17
                        mol_type = protein
                        organism = Gallus gallus
SEQUENCE: 145
GVPISSGGFG ISGLGSR                                                  17

SEQ ID NO: 146          moltype = AA  length = 15
FEATURE                 Location/Qualifiers
source                  1..15
                        mol_type = protein
                        organism = Gallus gallus
SEQUENCE: 146
VVVTLPGPIL SSFPQ                                                    15

SEQ ID NO: 147          moltype = AA  length = 15
FEATURE                 Location/Qualifiers
```

```
source                  1..15
                        mol_type = protein
                        organism = Gallus gallus
SEQUENCE: 147
RVVIQPSPVV VTLPG                                                          15

SEQ ID NO: 148          moltype = AA  length = 15
FEATURE                 Location/Qualifiers
source                  1..15
                        mol_type = protein
                        organism = Gallus gallus
SEQUENCE: 148
SRVVIQPSPV VVTLP                                                          15

SEQ ID NO: 149          moltype = AA  length = 16
FEATURE                 Location/Qualifiers
source                  1..16
                        mol_type = protein
                        organism = Gallus gallus
SEQUENCE: 149
PSPVVVTLPG PILSSF                                                         16

SEQ ID NO: 150          moltype = AA  length = 16
FEATURE                 Location/Qualifiers
source                  1..16
                        mol_type = protein
                        organism = Gallus gallus
SEQUENCE: 150
AIQPPPVVVT LPGPIL                                                         16

SEQ ID NO: 151          moltype = AA  length = 16
FEATURE                 Location/Qualifiers
source                  1..16
                        mol_type = protein
                        organism = Gallus gallus
SEQUENCE: 151
IQPSPVVVTL PGPILS                                                         16

SEQ ID NO: 152          moltype = AA  length = 16
FEATURE                 Location/Qualifiers
source                  1..16
                        mol_type = protein
                        organism = Gallus gallus
SEQUENCE: 152
VIQPSPVVVT LPGPIL                                                         16

SEQ ID NO: 153          moltype = AA  length = 17
FEATURE                 Location/Qualifiers
source                  1..17
                        mol_type = protein
                        organism = Gallus gallus
SEQUENCE: 153
VPISSGGFGI SGLGSRF                                                        17

SEQ ID NO: 154          moltype = AA  length = 16
FEATURE                 Location/Qualifiers
source                  1..16
                        mol_type = protein
                        organism = Gallus gallus
SEQUENCE: 154
SRVVIQPSPV VVTLPG                                                         16

SEQ ID NO: 155          moltype = AA  length = 17
FEATURE                 Location/Qualifiers
source                  1..17
                        mol_type = protein
                        organism = Gallus gallus
SEQUENCE: 155
SILSEEGVPI SSGGFGI                                                        17

SEQ ID NO: 156          moltype = AA  length = 16
FEATURE                 Location/Qualifiers
source                  1..16
                        mol_type = protein
                        organism = Gallus gallus
SEQUENCE: 156
PVVVTLPGPI LSSFPQ                                                         16

SEQ ID NO: 157          moltype = AA  length = 16
```

```
FEATURE               Location/Qualifiers
source                1..16
                      mol_type = protein
                      organism = Gallus gallus
SEQUENCE: 157
RVVIQPSPVV VTLPGP                                            16

SEQ ID NO: 158        moltype = AA  length = 18
FEATURE               Location/Qualifiers
source                1..18
                      mol_type = protein
                      organism = Gallus gallus
SEQUENCE: 158
SAAVGSILSE EGVPISSG                                          18

SEQ ID NO: 159        moltype = AA  length = 16
FEATURE               Location/Qualifiers
source                1..16
                      mol_type = protein
                      organism = Gallus gallus
SEQUENCE: 159
VVVTLPGPIL SSFPQN                                            16

SEQ ID NO: 160        moltype = AA  length = 18
FEATURE               Location/Qualifiers
source                1..18
                      mol_type = protein
                      organism = Gallus gallus
SEQUENCE: 160
GVPISSGGFG ISGLGSRF                                          18

SEQ ID NO: 161        moltype = AA  length = 17
FEATURE               Location/Qualifiers
source                1..17
                      mol_type = protein
                      organism = Gallus gallus
SEQUENCE: 161
PSPVVVTLPG PILSSFP                                           17

SEQ ID NO: 162        moltype = AA  length = 17
FEATURE               Location/Qualifiers
source                1..17
                      mol_type = protein
                      organism = Gallus gallus
SEQUENCE: 162
VAIQPPPVVV TLPGPIL                                           17

SEQ ID NO: 163        moltype = AA  length = 17
FEATURE               Location/Qualifiers
source                1..17
                      mol_type = protein
                      organism = Gallus gallus
SEQUENCE: 163
VIQPSPVVVT LPGPILS                                           17

SEQ ID NO: 164        moltype = AA  length = 17
FEATURE               Location/Qualifiers
source                1..17
                      mol_type = protein
                      organism = Gallus gallus
SEQUENCE: 164
VVIQPSPVVV TLPGPIL                                           17

SEQ ID NO: 165        moltype = AA  length = 17
FEATURE               Location/Qualifiers
source                1..17
                      mol_type = protein
                      organism = Gallus gallus
SEQUENCE: 165
SPVVVTLPGP ILSSFPQ                                           17

SEQ ID NO: 166        moltype = AA  length = 15
FEATURE               Location/Qualifiers
source                1..15
                      mol_type = protein
                      organism = Gallus gallus
SEQUENCE: 166
VILSNTKTQY SIKIH                                             15
```

```
SEQ ID NO: 167         moltype = AA  length = 17
FEATURE                Location/Qualifiers
source                 1..17
                       mol_type = protein
                       organism = Gallus gallus
SEQUENCE: 167
SRVVIQPSPV VVTLPGP                                                17

SEQ ID NO: 168         moltype = AA  length = 17
FEATURE                Location/Qualifiers
source                 1..17
                       mol_type = protein
                       organism = Gallus gallus
SEQUENCE: 168
DSRVVIQPSP VVVTLPG                                                17

SEQ ID NO: 169         moltype = AA  length = 17
FEATURE                Location/Qualifiers
source                 1..17
                       mol_type = protein
                       organism = Gallus gallus
SEQUENCE: 169
PVVVTLPGPI LSSFPQN                                                17

SEQ ID NO: 170         moltype = AA  length = 17
FEATURE                Location/Qualifiers
source                 1..17
                       mol_type = protein
                       organism = Gallus gallus
SEQUENCE: 170
RVVIQPSPVV VTLPGPI                                                17

SEQ ID NO: 171         moltype = AA  length = 19
FEATURE                Location/Qualifiers
source                 1..19
                       mol_type = protein
                       organism = Gallus gallus
SEQUENCE: 171
GVPISSGGFG ISGLGSRFS                                              19

SEQ ID NO: 172         moltype = AA  length = 18
FEATURE                Location/Qualifiers
source                 1..18
                       mol_type = protein
                       organism = Gallus gallus
SEQUENCE: 172
SVAIQPPPVV VTLPGPIL                                               18

SEQ ID NO: 173         moltype = AA  length = 18
FEATURE                Location/Qualifiers
source                 1..18
                       mol_type = protein
                       organism = Gallus gallus
SEQUENCE: 173
VAIQPPPVVV TLPGPILS                                               18

SEQ ID NO: 174         moltype = AA  length = 18
FEATURE                Location/Qualifiers
source                 1..18
                       mol_type = protein
                       organism = Gallus gallus
SEQUENCE: 174
VVIQPSPVVV TLPGPILS                                               18

SEQ ID NO: 175         moltype = AA  length = 18
FEATURE                Location/Qualifiers
source                 1..18
                       mol_type = protein
                       organism = Gallus gallus
SEQUENCE: 175
PSPVVVTLPG PILSSFPQ                                               18

SEQ ID NO: 176         moltype = AA  length = 20
FEATURE                Location/Qualifiers
source                 1..20
                       mol_type = protein
                       organism = Gallus gallus
SEQUENCE: 176
GVPISSGGFG ISGLGSRFSG                                             20
```

```
SEQ ID NO: 177          moltype = AA  length = 18
FEATURE                 Location/Qualifiers
source                  1..18
                        mol_type = protein
                        organism = Gallus gallus
SEQUENCE: 177
AVPLVRPVTM VPSIPGIP                                                18

SEQ ID NO: 178          moltype = AA  length = 18
FEATURE                 Location/Qualifiers
source                  1..18
                        mol_type = protein
                        organism = Gallus gallus
SEQUENCE: 178
PPPVVVTLPG PILSSFPQ                                                18

SEQ ID NO: 179          moltype = AA  length = 18
FEATURE                 Location/Qualifiers
source                  1..18
                        mol_type = protein
                        organism = Gallus gallus
SEQUENCE: 179
SPVVVTLPGP ILSSFPQN                                                18

SEQ ID NO: 180          moltype = AA  length = 18
FEATURE                 Location/Qualifiers
source                  1..18
                        mol_type = protein
                        organism = Gallus gallus
SEQUENCE: 180
LPGPGLQLLH GTTTLAFK                                                18

SEQ ID NO: 181          moltype = AA  length = 18
FEATURE                 Location/Qualifiers
source                  1..18
                        mol_type = protein
                        organism = Gallus gallus
SEQUENCE: 181
PPPVVVTFPG PILSSFPQ                                                18

SEQ ID NO: 182          moltype = AA  length = 19
FEATURE                 Location/Qualifiers
source                  1..19
                        mol_type = protein
                        organism = Gallus gallus
SEQUENCE: 182
SVAIQPPPVV VTLPGPILS                                               19

SEQ ID NO: 183          moltype = AA  length = 19
FEATURE                 Location/Qualifiers
source                  1..19
                        mol_type = protein
                        organism = Gallus gallus
SEQUENCE: 183
SSVAIQPPPV VVTLPGPIL                                               19

SEQ ID NO: 184          moltype = AA  length = 18
FEATURE                 Location/Qualifiers
source                  1..18
                        mol_type = protein
                        organism = Gallus gallus
SEQUENCE: 184
RVVIQPSPVV VTLPGPIL                                                18

SEQ ID NO: 185          moltype = AA  length = 19
FEATURE                 Location/Qualifiers
source                  1..19
                        mol_type = protein
                        organism = Gallus gallus
SEQUENCE: 185
PSPVVVTLPG PILSSFPQN                                               19

SEQ ID NO: 186          moltype = AA  length = 21
FEATURE                 Location/Qualifiers
source                  1..21
                        mol_type = protein
                        organism = Gallus gallus
SEQUENCE: 186
```

```
SILSEEGVPI SSGGFGISGL G                                     21

SEQ ID NO: 187          moltype = AA  length = 19
FEATURE                 Location/Qualifiers
source                  1..19
                        mol_type = protein
                        organism = Gallus gallus
SEQUENCE: 187
SRVVIQPSPV VVTLPGPIL                                        19

SEQ ID NO: 188          moltype = AA  length = 19
FEATURE                 Location/Qualifiers
source                  1..19
                        mol_type = protein
                        organism = Gallus gallus
SEQUENCE: 188
RVVIQPSPVV VTLPGPILS                                        19

SEQ ID NO: 189          moltype = AA  length = 22
FEATURE                 Location/Qualifiers
source                  1..22
                        mol_type = protein
                        organism = Gallus gallus
SEQUENCE: 189
SVPIGAGGSL GLGGFGWSGL GR                                    22

SEQ ID NO: 190          moltype = AA  length = 22
FEATURE                 Location/Qualifiers
source                  1..22
                        mol_type = protein
                        organism = Gallus gallus
SEQUENCE: 190
TAVGSSTSAA VGSILSEEGV PI                                    22

SEQ ID NO: 191          moltype = AA  length = 22
FEATURE                 Location/Qualifiers
source                  1..22
                        mol_type = protein
                        organism = Gallus gallus
SEQUENCE: 191
SAAVGSILSE EGVPISSGGF GI                                    22

SEQ ID NO: 192          moltype = AA  length = 21
FEATURE                 Location/Qualifiers
source                  1..21
                        mol_type = protein
                        organism = Gallus gallus
SEQUENCE: 192
SEEGVPISSG GFGISGLGSR F                                     21

SEQ ID NO: 193          moltype = AA  length = 20
FEATURE                 Location/Qualifiers
source                  1..20
                        mol_type = protein
                        organism = Gallus gallus
SEQUENCE: 193
SRVVIQPSPV VVTLPGPILS                                       20

SEQ ID NO: 194          moltype = AA  length = 23
FEATURE                 Location/Qualifiers
source                  1..23
                        mol_type = protein
                        organism = Gallus gallus
SEQUENCE: 194
SVPIGAGGSL GLGGFGWSGL GRG                                   23

SEQ ID NO: 195          moltype = AA  length = 20
FEATURE                 Location/Qualifiers
source                  1..20
                        mol_type = protein
                        organism = Gallus gallus
SEQUENCE: 195
DSRVVIQPSP VVVTLPGPIL                                       20

SEQ ID NO: 196          moltype = AA  length = 23
FEATURE                 Location/Qualifiers
source                  1..23
                        mol_type = protein
                        organism = Gallus gallus
```

```
SEQUENCE: 196
TAVGSSTSAA VGSILSEEGV PIS                                          23

SEQ ID NO: 197         moltype = AA  length = 22
FEATURE                Location/Qualifiers
source                 1..22
                       mol_type = protein
                       organism = Gallus gallus
SEQUENCE: 197
LRGDVGPVGR TGEQGIAGPP GF                                           22

SEQ ID NO: 198         moltype = AA  length = 21
FEATURE                Location/Qualifiers
source                 1..21
                       mol_type = protein
                       organism = Gallus gallus
SEQUENCE: 198
SRVVIQPSPV VVTLPGPILS S                                            21

SEQ ID NO: 199         moltype = AA  length = 21
FEATURE                Location/Qualifiers
source                 1..21
                       mol_type = protein
                       organism = Gallus gallus
SEQUENCE: 199
VVIQPSPVVV TLPGPILSSF P                                            21

SEQ ID NO: 200         moltype = AA  length = 22
FEATURE                Location/Qualifiers
source                 1..22
                       mol_type = protein
                       organism = Gallus gallus
SEQUENCE: 200
GVPISSGGFG ISGLGSRFSG RR                                           22

SEQ ID NO: 201         moltype = AA  length = 24
FEATURE                Location/Qualifiers
source                 1..24
                       mol_type = protein
                       organism = Gallus gallus
SEQUENCE: 201
SVPIGAGGSL GLGGFGWSGL GRGL                                         24

SEQ ID NO: 202         moltype = AA  length = 21
FEATURE                Location/Qualifiers
source                 1..21
                       mol_type = protein
                       organism = Gallus gallus
SEQUENCE: 202
DSRVVIQPSP VVVTLPGPIL S                                            21

SEQ ID NO: 203         moltype = AA  length = 21
FEATURE                Location/Qualifiers
source                 1..21
                       mol_type = protein
                       organism = Gallus gallus
SEQUENCE: 203
VIQPSPVVVT LPGPILSSFP Q                                            21

SEQ ID NO: 204         moltype = AA  length = 24
FEATURE                Location/Qualifiers
source                 1..24
                       mol_type = protein
                       organism = Gallus gallus
SEQUENCE: 204
AVGSILSEEG VPISSGGFGI SGLG                                         24

SEQ ID NO: 205         moltype = AA  length = 21
FEATURE                Location/Qualifiers
source                 1..21
                       mol_type = protein
                       organism = Gallus gallus
SEQUENCE: 205
RVVIQPSPVV VTLPGPILSS F                                            21

SEQ ID NO: 206         moltype = AA  length = 23
FEATURE                Location/Qualifiers
source                 1..23
                       mol_type = protein
```

```
                        organism = Gallus gallus
SEQUENCE: 206
SILSEEGVPI SSGGFGISGL GSR                                                23

SEQ ID NO: 207          moltype = AA  length = 21
FEATURE                 Location/Qualifiers
source                  1..21
                        mol_type = protein
                        organism = Gallus gallus
SEQUENCE: 207
IPSSVPESSF KIKGNSSSFH I                                                  21

SEQ ID NO: 208          moltype = AA  length = 22
FEATURE                 Location/Qualifiers
source                  1..22
                        mol_type = protein
                        organism = Gallus gallus
SEQUENCE: 208
VAIQPPPVVV TLPGPILSSF PQ                                                 22

SEQ ID NO: 209          moltype = AA  length = 25
FEATURE                 Location/Qualifiers
source                  1..25
                        mol_type = protein
                        organism = Gallus gallus
SEQUENCE: 209
TAVGSSTSAA VGSILSEEGV PISSG                                              25

SEQ ID NO: 210          moltype = AA  length = 22
FEATURE                 Location/Qualifiers
source                  1..22
                        mol_type = protein
                        organism = Gallus gallus
SEQUENCE: 210
VVIQPSPVVV TLPGPILSSF PQ                                                 22

SEQ ID NO: 211          moltype = AA  length = 23
FEATURE                 Location/Qualifiers
source                  1..23
                        mol_type = protein
                        organism = Gallus gallus
SEQUENCE: 211
PSPVVVTLPG PILSSFPQNT AVG                                                23

SEQ ID NO: 212          moltype = AA  length = 20
FEATURE                 Location/Qualifiers
source                  1..20
                        mol_type = protein
                        organism = Gallus gallus
SEQUENCE: 212
KENFEVLCKD GTRKPVTDAE                                                    20

SEQ ID NO: 213          moltype = AA  length = 21
FEATURE                 Location/Qualifiers
source                  1..21
                        mol_type = protein
                        organism = Gallus gallus
SEQUENCE: 213
SIQACKLAQS HGWGVMVSHR S                                                  21

SEQ ID NO: 214          moltype = AA  length = 22
FEATURE                 Location/Qualifiers
source                  1..22
                        mol_type = protein
                        organism = Gallus gallus
SEQUENCE: 214
SRVVIQPSPV VVTLPGPILS SF                                                 22

SEQ ID NO: 215          moltype = AA  length = 22
FEATURE                 Location/Qualifiers
source                  1..22
                        mol_type = protein
                        organism = Gallus gallus
SEQUENCE: 215
RVVIQPSPVV VTLPGPILSS FP                                                 22

SEQ ID NO: 216          moltype = AA  length = 23
FEATURE                 Location/Qualifiers
source                  1..23
```

```
                       mol_type = protein
                       organism = Gallus gallus
SEQUENCE: 216
EQPPLCVASV SVKEPASETP AVP                                              23

SEQ ID NO: 217         moltype = AA  length = 23
FEATURE                Location/Qualifiers
source                 1..23
                       mol_type = protein
                       organism = Gallus gallus
SEQUENCE: 217
SVAIQPPPVV VTLPGPILSS FPQ                                              23

SEQ ID NO: 218         moltype = AA  length = 26
FEATURE                Location/Qualifiers
source                 1..26
                       mol_type = protein
                       organism = Gallus gallus
SEQUENCE: 218
SAAVGSILSE EGVPISSGGF GISGLG                                           26

SEQ ID NO: 219         moltype = AA  length = 24
FEATURE                Location/Qualifiers
source                 1..24
                       mol_type = protein
                       organism = Gallus gallus
SEQUENCE: 219
SILSEEGVPI SSGGFGISGL GSRF                                             24

SEQ ID NO: 220         moltype = AA  length = 24
FEATURE                Location/Qualifiers
source                 1..24
                       mol_type = protein
                       organism = Gallus gallus
SEQUENCE: 220
PSPVVVTLPG PILSSFPQNT AVGS                                             24

SEQ ID NO: 221         moltype = AA  length = 23
FEATURE                Location/Qualifiers
source                 1..23
                       mol_type = protein
                       organism = Gallus gallus
SEQUENCE: 221
VVIQPSPVVV TLPGPILSSF PQN                                              23

SEQ ID NO: 222         moltype = AA  length = 23
FEATURE                Location/Qualifiers
source                 1..23
                       mol_type = protein
                       organism = Gallus gallus
SEQUENCE: 222
SRVVIQPSPV VVTLPGPILS SFP                                              23

SEQ ID NO: 223         moltype = AA  length = 24
FEATURE                Location/Qualifiers
source                 1..24
                       mol_type = protein
                       organism = Gallus gallus
SEQUENCE: 223
SSVAIQPPPV VVTLPGPILS SFPQ                                             24

SEQ ID NO: 224         moltype = AA  length = 23
FEATURE                Location/Qualifiers
source                 1..23
                       mol_type = protein
                       organism = Gallus gallus
SEQUENCE: 224
RVVIQPSPVV VTLPGPILSS FPQ                                              23

SEQ ID NO: 225         moltype = AA  length = 25
FEATURE                Location/Qualifiers
source                 1..25
                       mol_type = protein
                       organism = Gallus gallus
SEQUENCE: 225
SILSEEGVPI SSGGFGISGL GSRFS                                            25

SEQ ID NO: 226         moltype = AA  length = 27
FEATURE                Location/Qualifiers
```

```
source                  1..27
                        mol_type = protein
                        organism = Gallus gallus
SEQUENCE: 226
TSAAVGSILS EEGVPISSGG FGISGLG                                       27

SEQ ID NO: 227          moltype = AA  length = 26
FEATURE                 Location/Qualifiers
source                  1..26
                        mol_type = protein
                        organism = Gallus gallus
SEQUENCE: 227
SILSEEGVPI SSGGFGISGL GSRFSG                                        26

SEQ ID NO: 228          moltype = AA  length = 24
FEATURE                 Location/Qualifiers
source                  1..24
                        mol_type = protein
                        organism = Gallus gallus
SEQUENCE: 228
SRVVIQPSPV VVTLPGPILS SFPQ                                          24

SEQ ID NO: 229          moltype = AA  length = 28
FEATURE                 Location/Qualifiers
source                  1..28
                        mol_type = protein
                        organism = Gallus gallus
SEQUENCE: 229
TAVGSSTSAA VGSILSEEGV PISSGGFG                                      28

SEQ ID NO: 230          moltype = AA  length = 28
FEATURE                 Location/Qualifiers
source                  1..28
                        mol_type = protein
                        organism = Gallus gallus
SEQUENCE: 230
STSAAVGSIL SEEGVPISSG GFGISGLG                                      28

SEQ ID NO: 231          moltype = AA  length = 24
FEATURE                 Location/Qualifiers
source                  1..24
                        mol_type = protein
                        organism = Gallus gallus
SEQUENCE: 231
RVVIQPSPVV VTLPGPILSS FPQN                                          24

SEQ ID NO: 232          moltype = AA  length = 25
FEATURE                 Location/Qualifiers
source                  1..25
                        mol_type = protein
                        organism = Gallus gallus
SEQUENCE: 232
SRVVIQPSPV VVTLPGPILS SFPQN                                         25

SEQ ID NO: 233          moltype = AA  length = 25
FEATURE                 Location/Qualifiers
source                  1..25
                        mol_type = protein
                        organism = Gallus gallus
SEQUENCE: 233
DSRVVIQPSP VVVTLPGPIL SSFPQ                                         25

SEQ ID NO: 234          moltype = AA  length = 29
FEATURE                 Location/Qualifiers
source                  1..29
                        mol_type = protein
                        organism = Gallus gallus
SEQUENCE: 234
TAVGSSTSAA VGSILSEEGV PISSGGFGI                                     29

SEQ ID NO: 235          moltype = AA  length = 29
FEATURE                 Location/Qualifiers
source                  1..29
                        mol_type = protein
                        organism = Gallus gallus
SEQUENCE: 235
SAAVGSILSE EGVPISSGGF GISGLGSRF                                     29

SEQ ID NO: 236          moltype = AA  length = 24
```

```
FEATURE                Location/Qualifiers
source                 1..24
                       mol_type = protein
                       organism = Gallus gallus
SEQUENCE: 236
VEQLVNLQHL DVAYNLLLEH AQLA                                     24

SEQ ID NO: 237         moltype = AA  length = 28
FEATURE                Location/Qualifiers
source                 1..28
                       mol_type = protein
                       organism = Gallus gallus
SEQUENCE: 237
SVAIQPPPVV VTLPGPILSS FPQSTAVG                                 28

SEQ ID NO: 238         moltype = AA  length = 28
FEATURE                Location/Qualifiers
source                 1..28
                       mol_type = protein
                       organism = Gallus gallus
SEQUENCE: 238
SILSEEGVPI SSGGFGISGL GSRFSGRR                                 28

SEQ ID NO: 239         moltype = AA  length = 30
FEATURE                Location/Qualifiers
source                 1..30
                       mol_type = protein
                       organism = Gallus gallus
SEQUENCE: 239
TSAAVGSILS EEGVPISSGG FGISGLGSRF                               30

SEQ ID NO: 240         moltype = AA  length = 29
FEATURE                Location/Qualifiers
source                 1..29
                       mol_type = protein
                       organism = Gallus gallus
SEQUENCE: 240
SSVAIQPPPV VVTLPGPILS SFPQSTAVG                                29

SEQ ID NO: 241         moltype = AA  length = 31
FEATURE                Location/Qualifiers
source                 1..31
                       mol_type = protein
                       organism = Gallus gallus
SEQUENCE: 241
STSAAVGSIL SEEGVPISSG GFGISGLGSR F                             31

SEQ ID NO: 242         moltype = AA  length = 31
FEATURE                Location/Qualifiers
source                 1..31
                       mol_type = protein
                       organism = Gallus gallus
SEQUENCE: 242
PSPVVVTLPG PILSSFPQNT AVGSSTSAAV G                             31

SEQ ID NO: 243         moltype = AA  length = 33
FEATURE                Location/Qualifiers
source                 1..33
                       mol_type = protein
                       organism = Gallus gallus
SEQUENCE: 243
TAVGSSTSAA VGSILSEEGV PISSGGFGIS GLG                           33

SEQ ID NO: 244         moltype = AA  length = 31
FEATURE                Location/Qualifiers
source                 1..31
                       mol_type = protein
                       organism = Gallus gallus
SEQUENCE: 244
AVGSILSEEG VPISSGGFGI SGLGSRFSGR R                             31

SEQ ID NO: 245         moltype = AA  length = 27
FEATURE                Location/Qualifiers
source                 1..27
                       mol_type = protein
                       organism = Gallus gallus
SEQUENCE: 245
NKVLVHCAMG RSRSATLVLA YLMIYKN                                  27
```

-continued

```
SEQ ID NO: 246         moltype = AA  length = 32
FEATURE                Location/Qualifiers
source                 1..32
                       mol_type = protein
                       organism = Gallus gallus
SEQUENCE: 246
SSVAIQPPPV VVTLPGPILS SFPQSTAVGS TA                                  32

SEQ ID NO: 247         moltype = AA  length = 32
FEATURE                Location/Qualifiers
source                 1..32
                       mol_type = protein
                       organism = Gallus gallus
SEQUENCE: 247
AAVGSILSEE GVPISSGGFG ISGLGSRFSG RR                                  32

SEQ ID NO: 248         moltype = AA  length = 35
FEATURE                Location/Qualifiers
source                 1..35
                       mol_type = protein
                       organism = Gallus gallus
SEQUENCE: 248
TAVGSSTSAA VGSILSEEGV PISSGGFGIS GLGSR                               35

SEQ ID NO: 249         moltype = AA  length = 33
FEATURE                Location/Qualifiers
source                 1..33
                       mol_type = protein
                       organism = Gallus gallus
SEQUENCE: 249
SAAVGSILSE EGVPISSGGF GISGLGSRFS GRR                                 33

SEQ ID NO: 250         moltype = AA  length = 34
FEATURE                Location/Qualifiers
source                 1..34
                       mol_type = protein
                       organism = Gallus gallus
SEQUENCE: 250
PSPVVVTLPG PILSSFPQNT AVGSSTSAAV GSIL                                34

SEQ ID NO: 251         moltype = AA  length = 35
FEATURE                Location/Qualifiers
source                 1..35
                       mol_type = protein
                       organism = Gallus gallus
SEQUENCE: 251
PSPVVVTLPG PILSSFPQNT AVGSSTSAAV GSILS                               35

SEQ ID NO: 252         moltype = AA  length = 36
FEATURE                Location/Qualifiers
source                 1..36
                       mol_type = protein
                       organism = Gallus gallus
SEQUENCE: 252
TAVGSSTSAA VGSILSEEGV PISSGGFGIS GLGSRF                              36

SEQ ID NO: 253         moltype = AA  length = 29
FEATURE                Location/Qualifiers
source                 1..29
                       mol_type = protein
                       organism = Gallus gallus
SEQUENCE: 253
RPRVYLHCTN PRHPKYREGD VTLFALNLS                                      29
```

USE OF THERMALLY HYDROLYZED KERATIN PEPTIDE SOLUTION IN ENHANCING THE YIELD AND QUALITY OF TEA LEAVES

PRIORITY CLAIM TO FOREIGN APPLICATION

Applicant hereby makes priority claim to a Taiwan application, number 112151702, having the Taiwan filing date of Dec. 29, 2023.

SEQUENCE LISTING

Table I (in Sequence Listing XML format) shows the at least 253 peptides and its annotated sequences for the solution generated in accordance with the disclosure of this application. The Sequence Listing XML file complies with the WIPO ST.26 requirements. Said XML copy, created on Mar. 17, 2024, is named Table-I-253_sequence and is 216 bytes in size.

Applicant hereby incorporates by reference said Sequence Listing XML file in its entirety as part of the disclosure and specification of the present application

BACKGROUND OF THE INVENTION

Present invention disclosed and claimed the method and application of a keratin hydrolysis peptide ("KHP") solution to enhance the yield and quality of tea leaves.

Hydrolyzed keratin has long been used to strengthen hairs, reduce hair splitting and breakage. Other beneficial uses include skin moisturization and wound healing. Keratin hydrolysate has also been known to function as a biofertilizer, boosting plants' growth by enhancing the plants' ability to receive and utilize nutrients, including commonly applied fertilizers.

The KHP solution is made by a hydrolysis process using feathers and water, via a high-temperature and high-pressure process, resulting in a solution that has many beneficial applications in the fields of horticulture, agriculture and potentially other farming businesses.

The tea tree (*Camellia* Sinesis) is a type of perennial evergreen woody plant; it is also a deciduous shrub. The leaves of a tea tree are thin, in a general oval shape, with small serrated edges. The young tender leaves sprouting out during Spring or Autumn seasons are most favored portion of the tea leaves for culling and harvesting as the source materials for making into tea drinks.

The bud tips are the growth points in tea trees where the new shoots/leaves appear. At the bud tips, very tiny white furs can be seen, referred to as the "white fur". The harvested tender leaves generally come in the types of one-bud-with-one-leaf, one-bud-with-two-leaf or one-bud-with-three-leaf. Generally, the tea leaves' harvesting stops at the one-bud-with-three-leaf stage; further harvesting after the fourth terminal-facing-leaf renders the tea leaf's age to be on the older side and the drink quality would drop.

The freshly harvest young and tender tea leaves are generally called "tea shoot".

The deliciousness of tea shoot has a negative correlation to the age of the tea leaf: too many terminal facing leaves, with fewer bud tips, will cause the tea flavor to thin out. In other words, higher maturity of the tea leaves, as indicated by the amount of terminal facing leaves, loses the tenderness and deliciousness of the tea shoot, which is sometimes referred to as "old".

The fertilizer of urea is commonly used in the tea tree farming. While it stimulates the budding rate and the overall tree growth, the incorrect concentration, or application timing, often leads to higher proportion of terminal facing leaves and earlier aging, as well as the polyphenol/amino acid ratio to decrease. This further affects the sufficient fermentation of tea leaves, which is the key step in the making of high-quality tea.

As such, the tea tree industry has a problem to solve: how to develop a new type of fertilization process that will promote the growth of the tea tree without advancing the aging process, and the application in the Spring season will be effective continuously to a second season, so as avoid the undesired impact of common urea fertilizer as stated earlier.

The inventors of present application prepare the KHP solutions, in accordance with the parameters disclosed herein, and apply to the tea plants during the spring sprouting period, resulting in boosted growth and development of the tea tree so that more tender leaves can sprout out without advancing the aging process of the new sprouting leaves that generate more terminal facing leaves.

SUMMARY OF THE INVENTION

The keratin solution is primarily based upon feather, which contains 85-91% keratin, 13-15% organic nitrogen, 1.6-2% organic sulfur, as well as other materials. The high keratin content has drawn many prior researches that work to break down, by enzyme, chemical agents, or fermentation process, into peptides, amino acids and other smaller molecules that can be used for animal feeds, plant fertilizers, and cultivation bases.

Around 2019, Nurdiawati, et al, came up with a hydrolysis process, by the mixture of α-amylase and protease to hydrolyze feather waste, resulting in a mixture of amino acids, fatty acids, and sugars. Nurdiawati experimented and adopted certain specific high-temperature and high-pressure setting in the hydrolysis process and discovered that the resulting solution, when mixed with some potassium and other minerals, can boost the growth of *Pogostemon cablin* and *Vigna radiata*, as reported in International Journal of Recycling or Organic Waste in Agriculture (8:221-232, 2019).

The inventors of present application, under the aegis of CH Biotech, developed and selected different feather and water compositions to perform the hydrolysis at higher temperature and higher pressure setting, resulting with different keratin hydrolysis peptide ("KHP") solution that can be used on different crops/plants.

The selected embodiment of present invention uses a mixture of water and feathers, and subject the mixture to a thermal hydrolysis process to create KHP solutions based upon temperature/pressure parameters as noted below.

The inventors used Dionex® UltiMate® 3000 UPLC to separate the peptides; an analysis is done via Thermo Orbitrap® Fushion™ Lumos™ Tribrid™ Orbitrap® mass spectrometry to identify the peptides, which are then subsequently confirmed by looking up the BIOPEP-UWM database.

The application of the KHP solution can be diluted. The range of dilution ratio between 50 times and-1,000 times (noted as 50×-1,000×) of water by volume can be done.

The inventors chose preferred dilution ratio of 125×-500×, out of the range of 50×-1,000, when applying KHP solution to the tea plants by leaf spray or soil infusion.

BRIEF DESCRIPTION OF DRAWINGS

The accompanying drawings, figures and tables, which are incorporated in and constitute a part of this specification, illustrate and exemplify the preferred embodiments of the invention. Together with the description, serve to explain the principles of the invention.

b. hydrolyzing the mixture in the container with a temperature and pressure setting of 195 °C and 16 kg/cm$^2$ for a duration of 40 minutes;

c. using a mass spectrometer to confirm the combination of peptides in the solution to contain at least 253 peptides as listed in the specification where their molecular masses are between 500 and 4,000 Daltons, and the concentration is in the range of $2.0\times10^5$~$4.5\times10^5$ ppm.

The keratin hydrolysis peptide (KHP) solution of the first embodiment is further filtered and concentrated to 200,000 ppm concentration.

The KHP solution in present application of the second embodiment takes the steps of:

a. Preparing the KHP solution by mixing 50 kg of feathers whose content is 50% water and 40 kg of water in a sealed container;

b. hydrolyzing the mixture in the container with a temperature and pressure setting of 185 °C and 12 kg/cm$^2$ for a duration of 80 minutes;

c. using a mass spectrometer to confirm the combination of peptides in the solution to contain at least 253 peptides as listed in the specification where their molecular masses are between 500 and 4,000 Daltons, and the concentration is in the range of $2.0\times10^5$~$4.5\times10^5$ ppm.

The keratin hydrolysis peptide (KHP) solution of the second embodiment is further filtered and concentrated to 301,500 ppm concentration.

The confirmation of some of the 253 peptides, in both embodiments, is further done by referencing the BIOPEP-UWM database.

The mixture ratio, temperature, pressure and duration parameters are summarized below:

| | Feather (kg) | Water (kg) | Water content in feather (%) | Pressure (kg/cm$^2$) | Temp. (°C) | Time (min) | Mass (Da) | Concen. (ppm) |
|---|---|---|---|---|---|---|---|---|
| KPH-1 | 66 | 44 | 50% | 16 | 195 | 40 | 593.3~3828.0 | 200000 |
| KHP-2 | 50 | 40 | 50% | 12 | 185 | 80 | 593.3~3508.9 | 301500 |

Figure 8A:
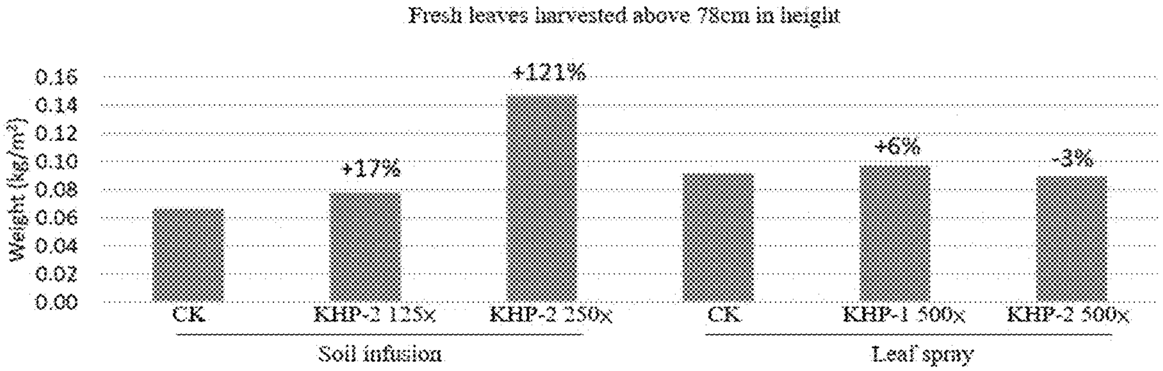
FIG. 8A shows the tea shoot weights where the harvested leaves are taken above 78 cm height from the ground, for KHP solutions applied by soil infusion and leaf spray.
Figure 8B:
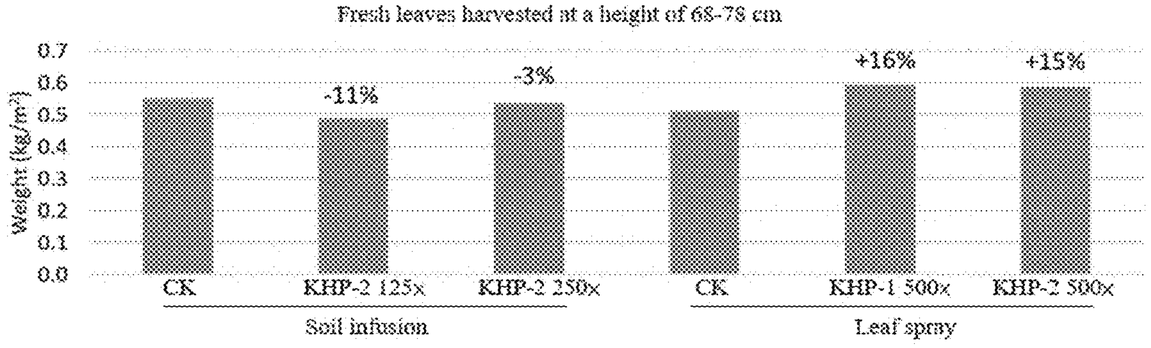

FIG. 8B shows the tea shoot weights where the harvested leaves are taken at height range of 68-78 cm from the ground, for KHP solutions applied by soil infusion and leaf spray.

Figure 8C:
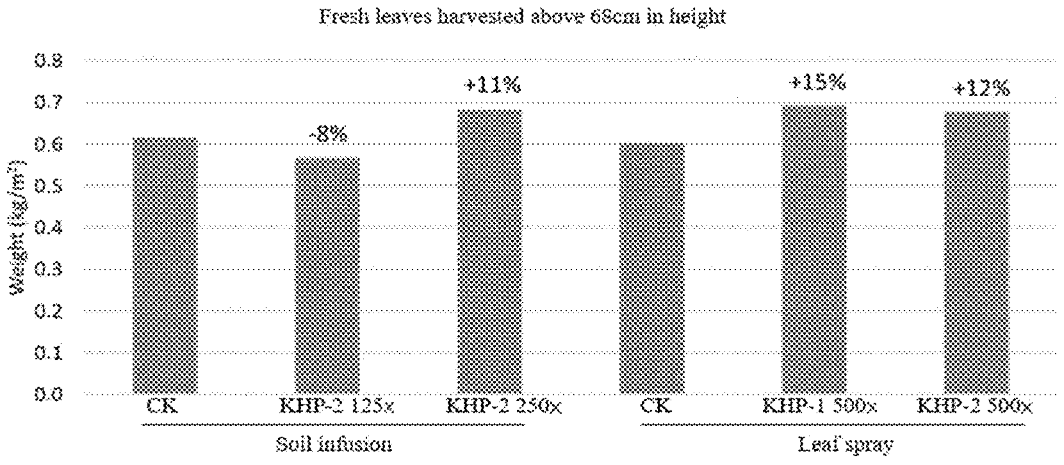

FIG. 8C shows the weight total from the two harvesting heights, for KHP solutions applied by soil infusion and leaf spray.

DETAILED DESCRIPTION OF THE INVENTION

The keratin hydrolysis peptide ("KHP") solution of present invention is made by a high-temperature and high-pressure process to treat a mixture of water and feathers as shown in the parameters herein.

The KHP solution in present application of a first embodiment takes the steps of:

a. Preparing the KHP solution by mixing 66 kg of feathers whose content is 50% water and 44 kg of water in a sealed container;

The inventors tested the KHP solutions by two methods of application to promote the growth of tea trees without advancing the aging process or increasing the terminal facing leaves appearance: soil infusion and leaf spray.

The inventors defined a unit area of 30×30 cm$^2$ for harvesting tea shoot and measuring weights. The inventors further defined a percentage value of cease-growing bud weight relative to the total bud weight, as indication of the increased tea leaf production without advancing the bud-aging side-effect.

The inventors further defined a hundred-bud weight count for a hundred buds in a 30×30 cm$^2$ area using the formula of [total tea shoot weight]/[bud count]×100.

The inventors also retained three (3) certified tasters to provide their taste evaluations, at total points of 100, divided into four (4) categories: aroma (30%), taste (30%), color (20%) and look (20%).

The inventors conducted many experiments to compare the effectiveness of KHP-1 and KHP-2 solutions, either by soil infusion or by leaf spray, at the dilution ratios as indicated herein below.

A check group, noted as CK, indicate the application of water only, without any urea fertilizer or any embodiment of KHP solution.

Figure 1A:
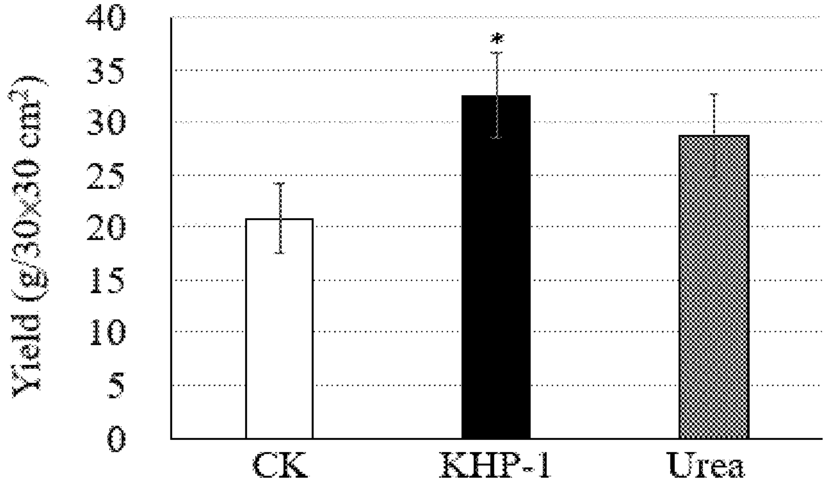
FIG. 1A shows the tea shoot harvested weights among the three groups CK, KHP-1 and Urea in a unit area.

One of the experiments involves first soil infusion application one week after initial harvesting, then leaf-spraying of KHP-1 500× solution twice, first time at the one-bud-with-one-leaf stage and second time at one-bud-with-two-leaf stage. In addition to a CK group, another urea application group of 200× dilution (200 kg of water to 1 kg of urea) is also tabulated. The result is shown in FIG. 1A where the tea shoot's production for the KHP-1 500× group is 32.54 g in a 900 $cm^2$ harvest area, higher than that of the CK group (20.86 g) and urea group (28.69 g).

Figure 1B:
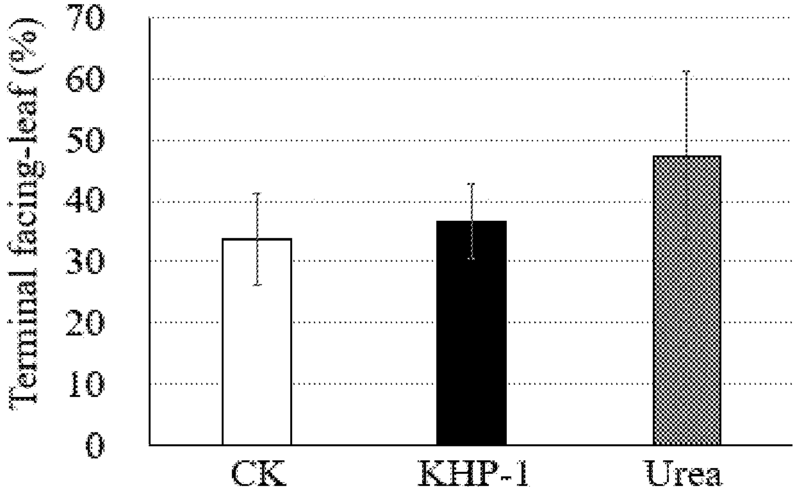
FIG. 1B shows the comparison of the proportions of terminal facing leaves calculated from the tea shoot among the three groups CK, KHP-1 and Urea.

When measuring the proportion of terminal facing leaves expressed as percentages, the KHP-1 group (500× dilution) is 36.6%, only slightly higher than that of the CK group (at 33.6%), whereas the urea group comes in at a much higher 47.4%. This is reflected in FIG. 1B.

Further experiment conducted by the inventors was done at a second growth season during Summer (after the spring harvesting where the leaf spray was done twice, at one-bud-with-one-leaf and one-bud-with-two-leaf stages as described earlier) where KHP-1 solutions at 3 dilution ratios of 250×, 500× and 1,000× are leaf-sprayed to the tea trees. A CK group of tea trees are sprayed with water only. Tea shoots from a unit area of 900 $cm^2$ are collected and measured, tabulated into FIGS. 2A and 2B.

Figure 2A:
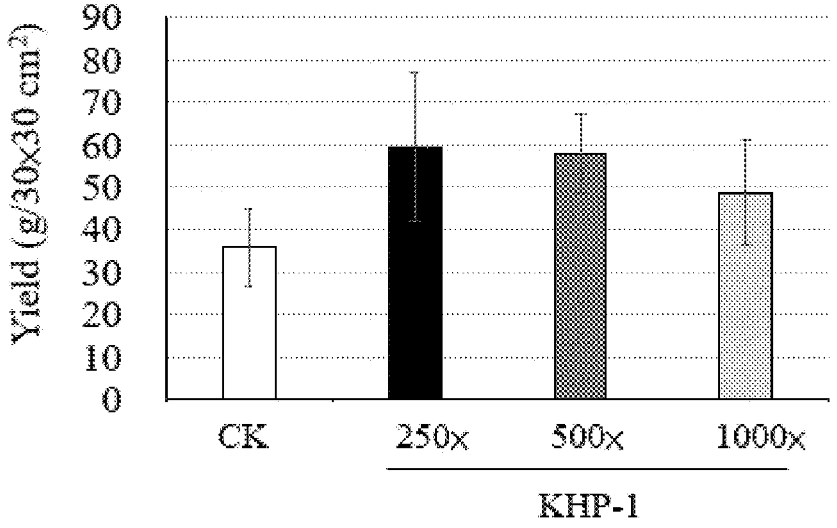
FIG. 2A shows the tea shoot harvested weights among the four groups CK, KHP-1 250×, KHP-1 500× and KHP-1 1000×.

FIG. 2A shows the increased tea shoot weight, in a unit area of 900 $cm^2$ over that of the CK group. The KHP-1 1000× group has tea shoot weight of 48.80+/−12.45 g; the KHP-1 500× group has tea shoot weight of 57.83+/−9.30 g; and the KHP-1 250× group has 59.6+/−17.47 g. All show superior tea shoot production yields.

Figure 2B:
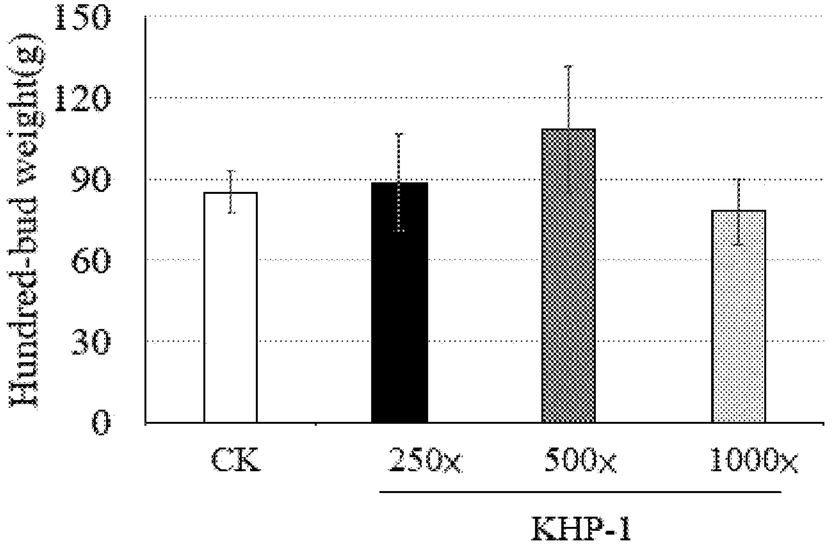
FIG. 2B shows the hundred-bud weight counts among the four groups CK, KHP-1 250×, KHP-1 500× and KHP-1 1000×.

For the hundred bud-weight count, FIG. 2B shows the KHP-1 250× and KHP-1 500× to have superior tea shoot production yield. The KHP-1 500× group comes in at 108.5+/−23.71 g; the KHP-1 250× group comes in at 88.95+/−17.96 g. Both are higher than the CK group's 85.27+/−7.61 g.

Figure 3:
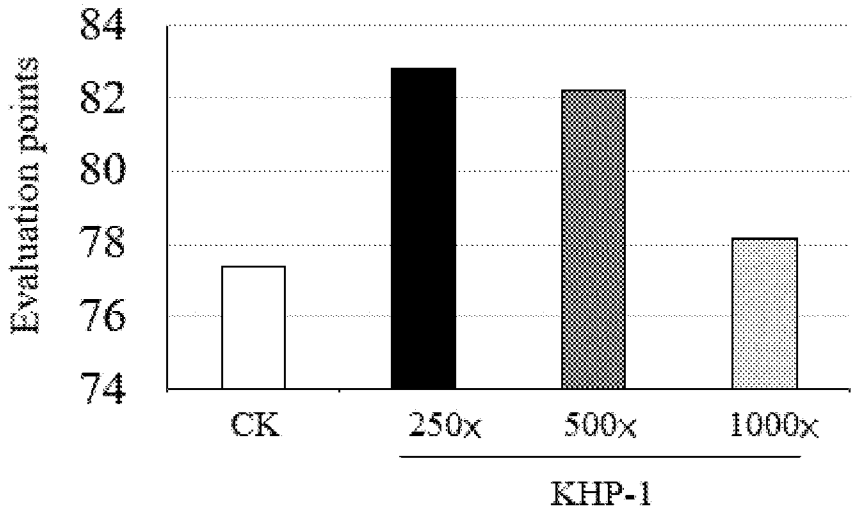
FIG. 3 shows the evaluation points assessed by certified tasters among the four groups CK, KHP-1 250×, KHP-1 500× and KHP-1 1000×.

From the tea shoot (one-bud-with-two-leaf) harvested at the second (Summer) season, the inventors use 150 ml of boiling water to make tea drink from 3 g of the tea shoot and asked the certified tasters to score the tea from the four groups: CK, KHP-1 250×, KHP-1 500× and KHP-1 1000×, based upon the four categories defined previously. FIG. 3 shows the KHP-1 250× at 82.85 points and the KHP-1 500× at 82.25, while the KHP-1 1000× at 78.12 points, all are higher than the CK group's 77.37 points.

The inventors experimented the KHP solutions on low-elevation tea trees, by infusing the soil with KHP-2 125× and KHP-2 500× solutions. Same as before, tea trees in CK group are given water only. The soil infusion is done 4 times after the initial nutritional liquids are used up.

The experiment on low-elevation tea trees also includes KHP application by leaf spraying with KHP-1 500× and KHP-2 500× solutions. The leaf spraying is done twice: at one-bud-with-one-leaf and one-bud-with-two-leaf stages.

Figure 4A:
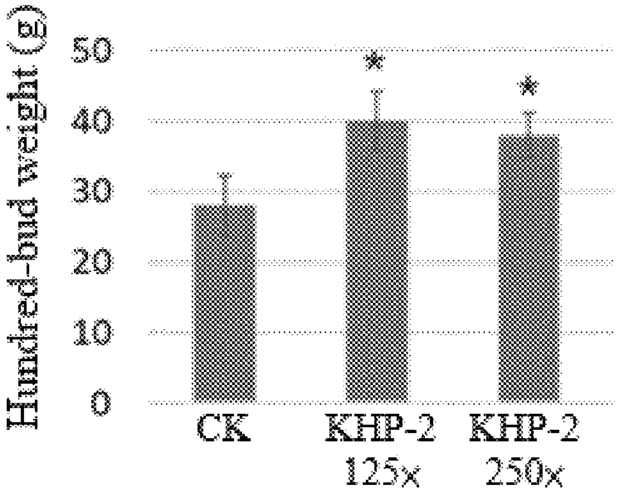
FIG. 4A shows the bud weights measured 9 days after KHP infusion for the three groups CK, KHP-2 125× and KHP-2 250×.
Figure 4B:
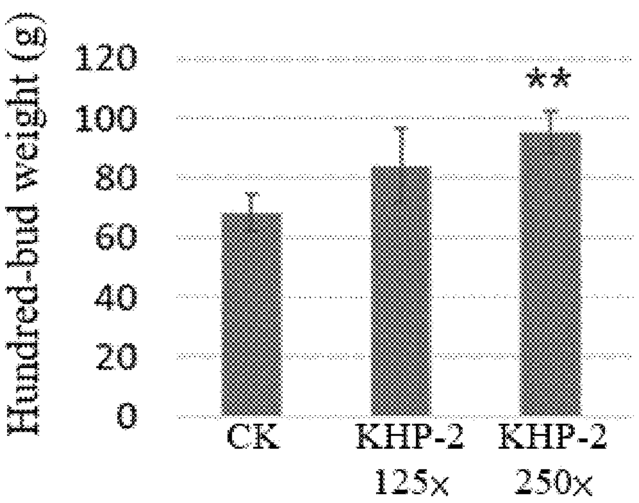
FIG. 4B shows the bud weights measured 21 days after KHP infusion for the three groups CK, KHP-2 125× and KHP-2 250×.

On the $9^{th}$ and $21^{st}$ days after the fourth soil infusion, the tea shoot hundred-bud weights are measured and tabulated into FIG. 4A and FIG. 4B.

As shown inf FIG. 4A, on the $9^{th}$ day, the hundred-bud weight in the KHP-2 125× group is 40+/−4 g, the hundred-bud weight in the KHP-2 250× group is 38+/−3 g; both are higher than the 28+/−4 g of the CK group.

As shown in FIG. 4B, on the $21^{st}$ day, the hundred-bud weight in the KHP-2 125× group is 84+/−13 g, the hundred-bud weight in the KHP-2 500× group is 95+/−7 g; both are higher than the 68+/−6 g of the CK group.

Figure 5A:
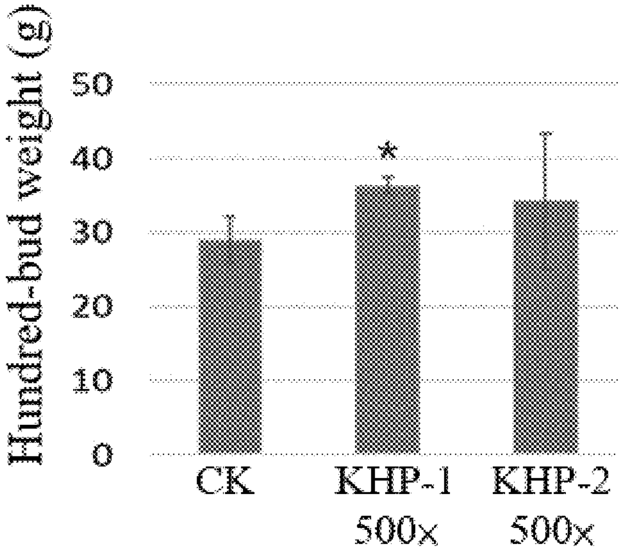
FIG. 5A shows the bud weights measured 6 days after the first KHP leaf spray for the three groups CK, KHP-1 500× and KHP-2 500×
Figure 5B:
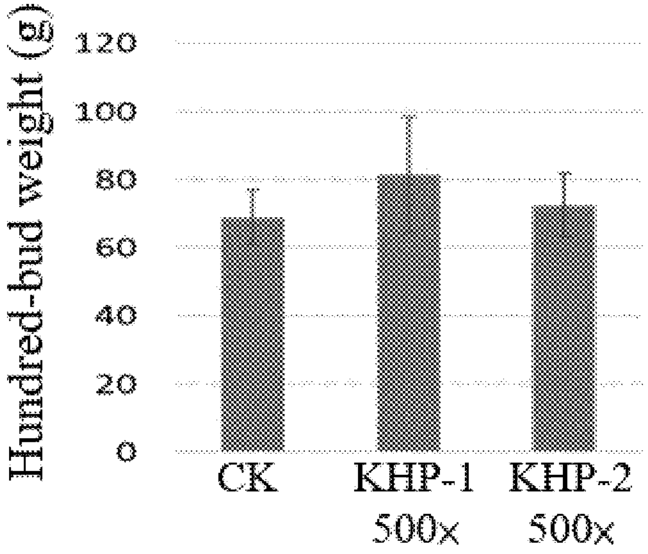
FIG. 5B shows the bud weights measured 12 days after the second KHP leaf spray for the three groups CK, KHP-1 500× and KHP-2 500×.

On the $6^{th}$ day after the first leaf spray and on the $12^{th}$ day after the second leaf spray, the hundred-bud weights in the three groups are measured and tabulated into FIGS. 5A and 5B: CK, KHP-1 500× and KHP-2 500×.

As shown in FIG. 5A, on the $6^{th}$ day after the first KHP leaf spray, the hundred-bud weight in the KHP-1 500× group is 36+/−1 g, the hundred-bud weight in the KHP-2 500× group is 34+/−9 g; both are higher than the 29+/−3 g of the CK group.

As shown inf FIG. 5B, on the $12^{th}$ day after the second KHP leaf spray, the hundred-bud weight in the KHP-1 500× group is 82+/−17 g, the hundred-bud weight in the KHP-2 500× group is 73+/−9 g; both are higher than the 69+/−8 g of the CK group.

The inventors used a leaf analysis system (WinFOLIA Pro LA 2400, Regent Instruments, Inc.) to scan and calculate leaf surface area of the first, second, third and fourth leaves from the buds on the $21^{st}$ day after the fourth soil infusion and the $12^{th}$ day after the second leaf spray. The results are tabulated into FIGS. 6 and 7.

Figure 6:
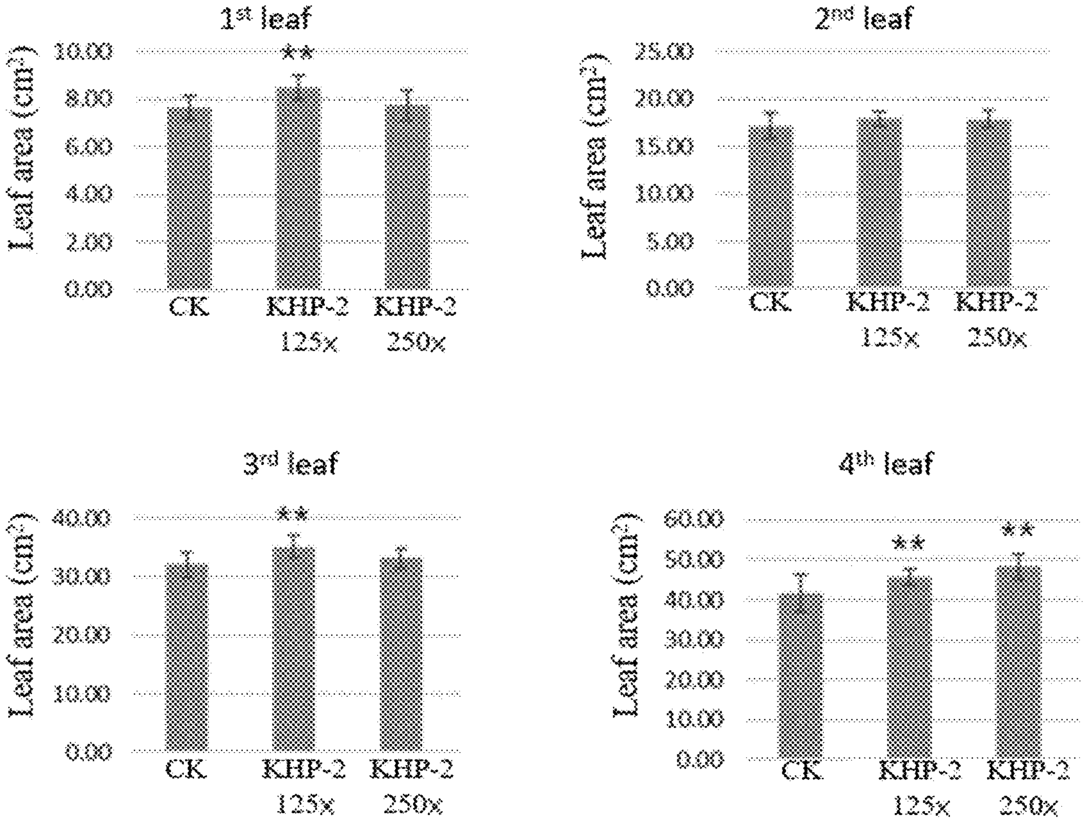
FIG. 6 shows the leaf area comparison among the first, second, third and fourth leaves from the buds on the $21^{st}$ day after KHP infusion for the three groups CK, KHP-2 125× and KHP-2 250×.

As shown in FIG. 6, the leaf area measured (in $cm^2$) from the first to the fourth leaves, on the $21^{st}$ day after KHP soil infusion are: 8.49+/−0.53, 17.94+/−0.75, 35.13+/−1.87 and 45.66+/−2.06 in the KHP-2 125× group; 7.75+/−0.65, 17.88+/−0.93, 33.15+/−1.69 and 48.33+/−3.07 in the KHP-2 250× group. All the measured figures with KHP solution infusion are better than the CK group's figures.

Figure 7:
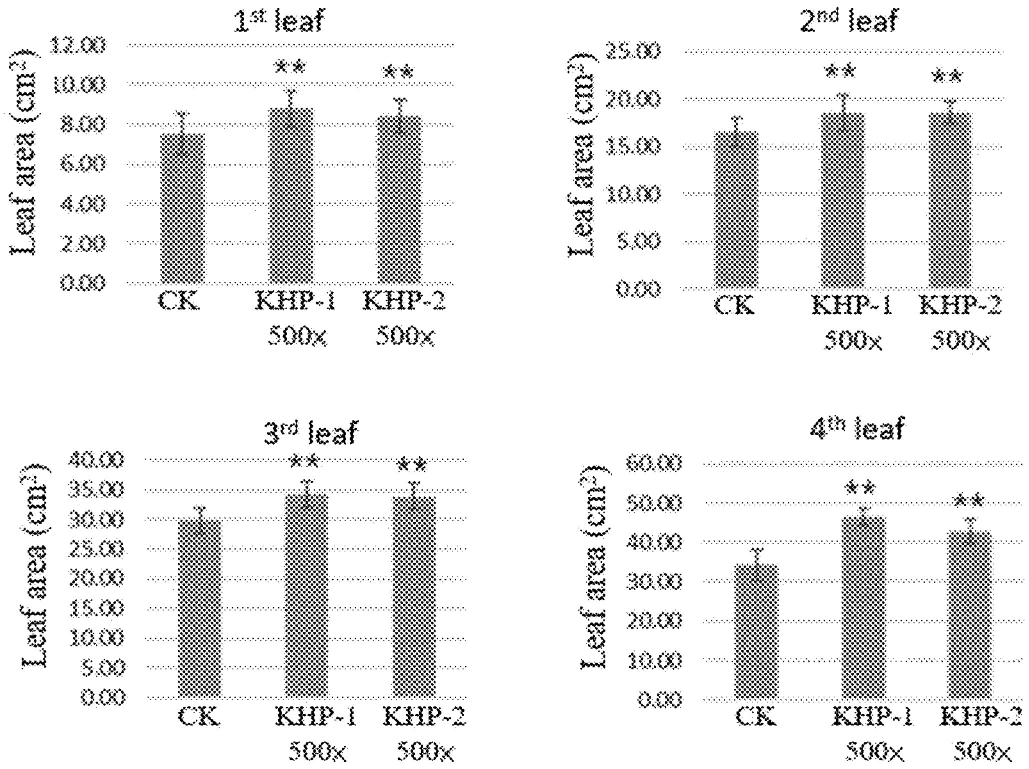
FIG. 7 shows the leaf area comparison among the first, second, third and fourth leaves from the buds on the $21^{st}$ day after KHP leaf spray for the three groups CK, KHP-1 500× and KHP-2 500×.

As shown in FIG. 7, the leaf area measured (in $cm^2$) from the first to the fourth leaves, on the $12^{th}$ day after second KHP leaf spray are: 8.81+/−0.87, 18.57+/−1.88, 34.18+/−2.21 and 45.66+/−2.06 in the KHP-1 500× group; 8.42+/−0.81, 18.61+/−1.1, 33.86+/−2.23 and 42.78+/−2.97 in the KHP-2 500× group. All the measured figures with KHP leaf spray are better than the CK group's figures.

The investors set a range of target height where tea leaves are harvested to measure the production yield of tea shoot in a unit area. Three groups are treated with KHP solution infused into the soil: CK, KHP-2 125× and KHP-2 250×. Three groups are treated with KHP solution receiving leaf spray: CK, KHP-1 500×, and KHP2-500×. The CK groups are treated with water only, without any kind of KHP solution. The results are tabulated into FIGS. 8A, 8B and 8C.

FIG. 8A reflected the comparison of tea shoot weight per square meter when harvesting was done at the tea tree with KHP solutions, at height of 78 cm. The three groups on the left are treated with soil infusion (the CK group received water only). The KHP-2 125× group shows 0.078 kg per square meter; the KHP-2 250× group shows 0.147 kg per square meter. Both are higher than that of CK group, at 0.067 kg per square meter, at increase percentage of 17% and 121%. The three groups on the right are treated with leaf spray, the KHP-1 500× group shows 0.098 kg per square meter, the KHP-2 500× shows 0.089 kg per square meter. The KHP-1 500× group's tea shoot is 6% higher than that of the CK group.

FIG. 8B reflected the comparison of tea shoot weight per square meter when harvesting was done at the tea tree with KHP solutions, at height of 68 cm. The three groups on the left are treated with soil infusion (the CK group received water only). There is no discernible effect to the tea shoot production yield in the three groups on the left. The three groups on the right are treated with leaf spray, the KHP-1 500× group shows 0.598 kg per square meter, the KHP-1 500× shows 0.588 kg per square meter. The KHP-1 500× and KHP-2 500× groups' increase percentage are 16% and 15% respectively over that of the CK group.

FIG. 8C reflects the sum total of two tea shoot harvestings, with the three groups of soil infusion on the left and the three groups of leaf spray on the right. As can be seen, other than the KHP-2 125× infusion, other method of KHP applications all increased the tea shoot production weight, over the CK group, by 11%, 15% and 12%.

Based upon the tests and experiments done by the inventors, it is confirmed that application of the KHP solutions, at the dilution ratios and manner of application as disclosed herein, effectively increased the production of tea leaves without advancing the bud aging side effect.

While the disclosure herein gave limited teachings and embodiment examples, it should be noted that the description and disclosure made herein illustrated the preferred embodiments of the invention and are not meant to limit the scope of the applicant's rights. Variations and alterations may be employed for yet additional embodiments without departing from the scope of the invention herein.

The invention claimed is:

1. A method of using a keratin hydrolysis peptide (KHP) solution to enhance the yield and quality of tea leaves, comprising the steps of:

a. preparing the KHP solution by mixing 66 kg of feathers whose content is 50% water and 44 kg of water in a sealed container;

b. hydrolyzing the mixture in the container with a temperature and pressure setting of 195 °C and 16 kg/cm$^2$ for a duration of 40 minutes;

c. using a mass spectrometer to confirm the combination of peptides in the solution to contain at least 253 peptides, wherein the 253 peptides comprise the amino acid sequences of SEQ ID Nos: 1-253 where their molecular masses are between 500 and 4,000 Daltons, and the concentration is in the range of $2.0\times10^5$~$4.5\times10^5$ ppm; and d. applying the KHP solution by either soil infusion or leaf spray.

2. The method of using a keratin hydrolysis peptide solution of claim 1 wherein the soil infusion application of KHP solution is done one week after initial harvesting.

3. The method of using a keratin hydrolysis peptide solution of claim 2 wherein the solution is diluted with water by volume at the ratio of 1:50 to 1:500.

4. The method of using a keratin hydrolysis peptide solution of claim 1 wherein leaf spray application of KHP solution is done at the one-bud-with-one-leaf and one-bud-with-two-leaf stages.

5. The method of using a keratin hydrolysis peptide solution of claim 4 wherein the solution is diluted with water by volume at the ratio of 1:50 to 1:500.

6. A method of using a keratin hydrolysis peptide (KHP) solution to enhance the yield and quality of tea leaves, comprising the steps of:

a. preparing the KHP solution by mixing 50 kg of feathers whose content is 50% water and 40 kg of water in a sealed container;

b. hydrolyzing the mixture in the container with a temperature and pressure setting of 185 °C and 12 $kg/cm^2$ for a duration of 80 minutes;

c. using a mass spectrometer to confirm the combination of peptides in the solution to contain at least 253 peptides wherein the 253 peptides comprise the amino acid sequences of SEQ ID Nos: 1-253 where their molecular masses are between 500 and 4,000 Daltons, and the concentration is in the range of $2.0\times10^5$~$4.5\times10^5$ ppm; and d. applying the KHP solution by either soil infusion or leaf spray.

7. The method of using a keratin hydrolysis peptide solution of claim 6 wherein soil infusion application of KHP solution is done one week after initial harvesting.

8. The method of using a keratin hydrolysis peptide solution of claim 7 wherein the solution is diluted with water by volume at the ratio of 1:50 to 1:500.

9. The method of using a keratin hydrolysis peptide solution of claim 6 wherein leaf spray application of KHP solution is done at the one-bud-with-one-leaf and one-bud-with-two-leaf stages.

10. The method of using a keratin hydrolysis peptide solution of claim 9 wherein the solution is diluted with water by volume at the ratio of 1:50 to 1:500.

* * * * *